United States Patent
Liao et al.

(10) Patent No.: US 9,713,072 B2
(45) Date of Patent: Jul. 18, 2017

(54) METHOD OF RELAY DISCOVERY AND COMMUNICATION IN A WIRELESS COMMUNICATIONS SYSTEM

(71) Applicant: HTC Corporation, Taoyuan, Taoyuan County (TW)

(72) Inventors: Ching-Yu Liao, Taoyuan (TW); Feng-Seng Chu, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 234 days.

(21) Appl. No.: 14/446,097

(22) Filed: Jul. 29, 2014

(65) Prior Publication Data

US 2015/0029866 A1    Jan. 29, 2015

Related U.S. Application Data

(60) Provisional application No. 61/860,236, filed on Jul. 30, 2013, provisional application No. 61/859,305, filed on Jul. 29, 2013.

(51) Int. Cl.
| | |
|---|---|
| *H04W 4/00* | (2009.01) |
| *H04W 48/14* | (2009.01) |
| *H04W 4/02* | (2009.01) |
| *H04W 52/02* | (2009.01) |
| *H04W 88/04* | (2009.01) |

(Continued)

(52) U.S. Cl.
CPC ........... *H04W 48/14* (2013.01); *H04W 4/008* (2013.01); *H04W 4/023* (2013.01); *H04W 52/0216* (2013.01); *H04W 52/0229* (2013.01); *H04B 7/2606* (2013.01); *H04W 8/005* (2013.01); *H04W 88/04* (2013.01); *Y02B 60/50* (2013.01)

(58) Field of Classification Search
CPC ..... H04W 48/14; H04W 4/008; H04W 4/023; H04W 52/0216; H04W 52/0229; H04W 88/04; H04W 8/005; Y02B 60/50; H04B 7/2606

See application file for complete search history.

(56) References Cited

U.S. PATENT DOCUMENTS 9,072,000 B2 *   6/2015   Tavildar ................ H04W 48/08
2013/0336161 A1 *  12/2013  Jung ................... H04W 76/023
                                                          370/254

(Continued)

OTHER PUBLICATIONS

Intel: "Solution for Public Safety UE-to-UE Relays", 3GPP Draft; S2-132848, SA WG2 Meeting #S2-98, Jul. 15-19, 2013, Valencia, Spain, XP050726213, pp. 1-7.

(Continued)

*Primary Examiner* — Phuc Tran
(74) *Attorney, Agent, or Firm* — Birch, Stewart, Kolasch & Birch, LLP

(57) ABSTRACT

A method of relay discovery and communication for a user equipment (UE) in a wireless communications system, including: receiving a first relay discovery request, from a remote UE which announces relay discovery requests; transmitting a relay discovery response including an identification of the UE, to the remote UE; receiving a second relay discovery request including the identification of the UE, from the remote UE; and activating a relay function to start relaying traffic of Proximity-based Service (ProSe) communication for the remote UE.

24 Claims, 15 Drawing Sheets

(51) Int. Cl.
    *H04W 8/00* (2009.01)
    *H04B 7/26* (2006.01)

(56) References Cited

U.S. PATENT DOCUMENTS

| | | | | | |
|---|---|---|---|---|---|
| 2015/0208225 | A1* | 7/2015 | Yu | ............... | H04W 4/008 370/329 |
| 2015/0304902 | A1* | 10/2015 | Yu | ............... | H04W 36/165 455/436 |
| 2016/0037568 | A1* | 2/2016 | Hakola | ............... | H04W 8/005 370/329 |
| 2016/0143077 | A1* | 5/2016 | Fodor | ............... | H04W 84/20 370/329 |

OTHER PUBLICATIONS

LG Electronics: "Solution on Rely for Public Safety ProSe", 3GPP Draft; S2-132614, SA WG2 Meeting S2#98, Jul. 15-19, 2013, Valencia, Spain, XP050725994, pp. 1-6.

Renesas Mobile Europe Ltd: "Network connection via ProSe UE-to-Network relay", 3GPP Draft, S2-132706, SA WG2 Meeting #98, Jul. 15-19, 2013, Valencia, Spain, XP050726084, pp. 1-3.

Renesas Mobile Europe Ltd: "Connection setup via ProSe UE-to-Network Relay", S2-131971, vol. SA WG2 Meeting #97, May 21, 2013, XP050709143, , Busan, South Korea, pp. 3-4.

ZTE: "ProSe UE-to-Network Relay", 3GPP Draft; S2-132844-Application Based Prose Relays, SA WG2 Meeting #98, Valencia, Spain, Jul. 18, 2013, XP050726209, pp. 2-3.

Advanced LTE, "3rd Generation Partnership Project; Technical Specification Group Services and System Aspects; Service requirements for the Evolved Packet System (EPS) (Release 12)", 3GPP TS 22.278, vol. 12.3.0, Jun. 2013, 45 pages.

Advanced LTE, 3rd Generation Partnership Project; Technical Specification Group Services and System Aspects; Study on architecture enhancements to support Proximity Services (ProSe) (Release 12), 3GPP TR 23.703, vol. 0.4.1. Jun. 2013, 85 pages.

ETSI TC Tetra, "Information about the system improvements requirements for the adoption of LTE for mission/business critical communications", 3GPP TSG-SA WG1 Meeting #58, S1-121247, Seville, Spain, May 7-11, 2012, 2 pages.

HTC, "UE Relay for Public Safety", SA WG2 Meeting S2#98, Agenda Item 6.4, ProSe/Rel-12, S2-132483, Valencia, Spain, Jul. 15-19, 2013, pp. 1-5.

HTC, "UE Relay for Public Safety", SA WG2 Meeting S2#98, Agenda Item 6.4, ProSe/Rel-12, S2-132829, Valencia, Spain, Jul. 15-19, 2013, pp. 1-6.

Qualcomm Incorporated, "Study on LTE Device to Device Proximity Services", 3GPP TSG RAN Meeting #58, RP-122009, Agenda Item 13.2, Dec. 2012, 6 pages.

TCCA CCBG, "Additional information: Group Communications & Proximity-based Services", CCBG_LS12-001, Jul. 27, 2012, 2 pages.

* cited by examiner

METHOD OF RELAY DISCOVERY AND COMMUNICATION IN A WIRELESS COMMUNICATIONS SYSTEM

CROSS REFERENCE TO RELATED APPLICATIONS

The present application is based on claims the benefit of U.S. Provisional Application No. 61/860,236 filed on Jul. 30, 2013, the entirety of which is incorporated by reference herein. The present application is also based on claims the benefit of U.S. Provisional Application No. 61/859,305 filed on Jul. 29, 2013, the entirety of which is incorporated by reference herein.

TECHNICAL FIELD

Aspects of the present invention relate generally to methods fir wireless communications systems and, more particularly, to methods of relay discovery and communication in a wireless communications system.

BACKGROUND

In a typical mobile communications environment, a user equipment (UE) device such as a mobile phone (also known as a cellular or cell phone), a laptop computer with wireless communications capability, or a personal digital assistant (PDA), may communicate voice and/or data signals with one or more service networks. The wireless communications between the UE and the service networks may be in compliance with various wireless technologies. A long-term evolution (LTE) system, initiated by the third generation partnership project (3GPP), is now being regarded as a new radio interface and radio network architecture that provides a high data rate, low latency, packet optimization, and improved system capacity and coverage. An evolution of core network with non-radio access aspects, known as System Architecture Evolution (SAE), is also initiated by 3GPP in accompanying with LTE.

Evolved Packet System (EPS) is a purely IP based network, consisting of user equipments (UEs), a LTE radio access network known as Evolved Universal Terrestrial Radio Access Network (E-UTRAN), and a SAE core network known as Evolved Packet Core (EPC). The EPS uses the concept of "EPS hearers" to route IP traffic from a gateway in external packet data networks to the UE. A bearer is an IP packet flow with a specific Quality of Service (QoS) between the gateway and the UE. The E-UTRAN is simply a network of plurality of evolved Node-Bs (eNBs) communicating with a plurality of UEs, which generate a flat architecture and there is no centralized controller. The eNBs are normally inter-connected via the X2-interface and towards the EPC by the S1-interface. The EPC includes a mobility management entity (MME), a Home Subscriber Server (HSS), a serving gateway (SGW), a packet data network gateway (PDN GW or PGW). The MME deals with the control plane. It handles the signalling related to mobility and security for E-UTRAN access. The MME is responsible for the tracking and the paging of UE in idle-mode. It is the termination point of the Non-Access Stratum (NAS). The MME handles bearer management and connection management. The HSS is a database that contains user-related and subscriber-related information. The HSS also provides support functions in mobility management, call and session setup, user authentication and access authorization. The Serving GW is the point of interconnect between the radio-side and the EPC, and it serves the UE by routing the incoming and outgoing IP packets. The PDN GW is the point of interconnect between the EPC and external IP networks called PDN (Packet Data Network), and it routes packets to and from the PDNs.

A long term evolution-advanced (UE-A) system, as its name implies, is an evolution of the UE system and has a similar network structure to the UE system.

In LTE-related systems, Proximity-based Service (ProSe) communication has been developed as a technology which allows UEs to communicate directly with each other in close proximity without transmitting/receiving data and/or control signals to the other via an eNB, which means a local or direct path can be used between the UEs. Therefore, in the 3GPP UE spectrum, the operator can move the data path (i.e., user plane) off the access to core networks to direct links between the UEs.

To extend the communication range for the public safety, a public safety ProSe UE capable of using a relay function can be configured to act as a relay UE, either UE-to-UE relay or a UE-to-Network relay. When being the relay UE, the relay UE may consume extra power for a relay discovery procedure and relay communication. Due to the limited battery life, a relay discovery procedure of the relay UE should be activated only when needed. However it is still not clear when and how the relay UE and a UE which requiring a relay perform the relay discovery procedure and activates the relay function.

As a result, methods of relay discovery and communication that may solve these problems are required.

SUMMARY

A detailed description is given in the following embodiments with reference to the accompanying drawings.

Methods of relay discovery and communication in wireless communications systems are provided.

In one exemplary embodiment, the invention is directed to a method of relay discovery and communication for a user equipment (UE) in a wireless communications system, comprising: receiving a first relay discovery request, from a remote UE which announces relay discovery requests; transmitting a relay discovery response including an identification of the UE, to the remote UE; receiving a second relay discovery request including the identification of the UE, from the remote UE; and activating a relay function to start relaying traffic of Proximity-based Service (ProSe) communication for the remote UE.

In one exemplary embodiment, the invention is directed to a method for relay discovery and communication for a user equipment (UE) in a wireless communications system, comprising: transmitting a first relay discovery request, for requesting any UE being capable of being a relay UE for relaying traffic of ProSe communication, receiving at least one relay discovery response from at least one relay UE which receives the first relay discovery request, wherein each relay discovery response includes an identification of a relay UE; and transmitting a second relay discovery request including an identification of a first relay UE among the at least one relay UE, for acknowledging the first relay UE to activate a relay function for relaying traffic of Proximity-based Service (ProSe) communication 1 hr the UE.

In one exemplary embodiment, the invention is directed to a method for relay discovery and communication for a user equipment (UE) in a wireless communications system, comprising: transmitting, a relay discovery request, for announcing that the UE is capable of being a relay, wherein the first relay discovery request includes an identification of the UE; receiving a relay discovery response from a remote UE which receives the relay discovery request, wherein the relay discovery response includes the identification of the UE; and activating a relay function to start relaying traffic of Proximity-based Service (ProSe) communication for the remote UE.

In one exemplary embodiment, the invention is directed to a method for relay discovery and communication for a user equipment (UE) in a wireless communications system, comprising: receiving at least one relay discovery request, each relay discovery request including an identification of a relay UE, from at least one relay UE; and transmitting a relay discovery response including an identification of a first relay UE among the at least one relay UE, for acknowledging the first relay UE to activate a relay function for relaying traffic of Proximity-based Service (ProSe) communication for the UE.

In one exemplary embodiment, the invention is directed to a method for relay discovery and communication for a user equipment (UE) in a wireless communications system, comprising: receiving a configuration message from a network in the wireless communications system, wherein the configuration message is utilized for configuring the UE to act as a either a monitoring UE or an announcing UE in a relay discovery procedure.

In one exemplary embodiment, the invention is directed to a method of relay discovery for a UE in a wireless communications system, comprising: receiving at least one relay discovery request, from a remote UE which announces relay discovery requests; transmitting at least one relay service request to a network; and receiving a relay service response indicating the acceptance of a relay service from the network, for activating a relay function of the UE to start relaying traffic of ProSe communication for the remote UE which announces relay discovery requests.

In one exemplary embodiment, the invention is directed to a method for relay discovery for a network in a wireless communications system, comprising: receiving at least one relay service request respectively from at least one UE capable of being a relay UE: selecting at least one relay UE among the at least one UE capable of being a relay UE based on the at least one relay service request; and transmitting at least one relay service response respectively to the least one relay UE, wherein the relay service response indicates the acceptance or rejection of activating the relay function in the relay UE.

In one exemplary embodiment, the invention is directed to a method of relay discovery for a user equipment (UE) in a wireless communications system, comprising: transmitting at least one relay discovery request, for announcing that the UE is capable of being a relay UE; receiving a relay discovery response from a remote UE which requires a relay and receives the relay discovery request; transmitting at least one relay service request to a network; and receiving a relay service response indicating the acceptance of a relay service from the network, for activating a relay function of the UE, wherein the relay function is for relaying traffic of Proximity-based Service (ProSe) communication for the remote UE.

A detailed description is given in the following embodiments with reference to the accompanying drawings.

DRAWINGS

The present invention can be more fully understood by reading the subsequent detailed description and examples with references made to the accompanying drawings, wherein.

DETAILED DESCRIPTION

Several exemplary embodiments of the application are described with reference to FIG. 1 to FIG. 15, which generally relate to methods of relay discovery and communication in a wireless communications system.

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof. Note that the 3rd Generation Partnership Project (3GPP) specifications described herein are used to teach the spirit of the invention, and the invention is not limited thereto.

In 3GPP specifications, a base station is typically referred to as a Node B, an evolved or enhanced Node B (eNB), a home enhanced or evolved Node B (HeNB) or some other similar terminology. As the scope of the invention should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network Local Area Network (LAN), the Internet, etc.) for wireless communication devices. The term "communication device" may be used to denote a wireless communication device and/or a base station. The term "application" shown in the description means a ProSe application as the application which supports ProSe functionality.

Figure 1:
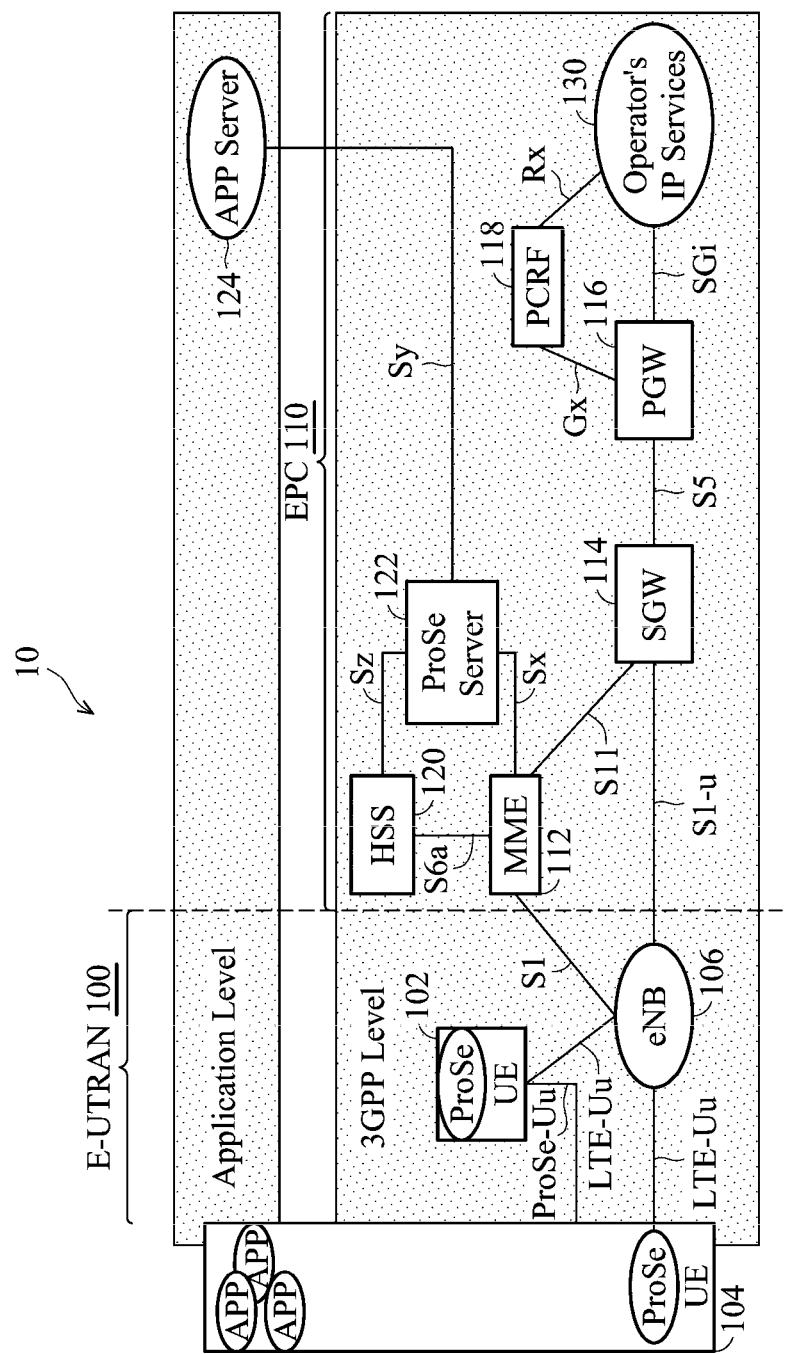
FIG. 1 illustrates an Evolved Packet System (EPS) for the Proximity Services (ProSe) in the Long Terms Evolution (LTE) system according to an embodiment of the present invention.

FIG. 1 illustrates an LTE network architecture diagram 10 for the Proximity Services (ProSe) according to an embodiment of the present invention. The UE network architecture 10 may be referred to as an Evolved Packet System (EPS) 10. In addition, FIG. 1 further illustrates the relationship of the ProSe entities at the UE, the ProSe associated network entities in the Evolved Packet Core (EPC), and the application entities. The EPS uses the concept of "EPS bearers" to route IP traffic from a gateway in the PDN to the UE. A bearer is an IP packet flow with a specific Quality of Service (QoS) between the gateway and the UE. In FIG. 1, an EPS 10 includes a UE 102, a UE 104, an Evolved Universal Terrestrial Radio Access Network (E-UTRAN) 100 and an Evolved Packet Core (EPC) 110, wherein each UE (the UE 102 or 104) includes only one ProSe entity and one or more applications utilizing the ProSe functionality, each application denoted as APP. The ProSe entity in each UE (e.g. UE 102 or 104) is utilized for the ProSe operations of discovery and communication. The ProSe entity communicates with the ProSe Server 122 on top of Non Access Stratum (NAS) signaling. APP(s) is an entity at the UE representing the third party applications or application instances in the UE designed for utilizing the proximity services. There may be more than one APP utilizing the ProSe functionality at the same time.

The E-UTRAN 100 includes one or more base stations, evolved Node-Bs (eNB) 106, which provides a user plane and a control plane and the eNB 106 communicates with each UE (e.g., UE 102 and the UE 104) via LTE-Uu interfaces. The UEs 102 and 104 communicate with each other via a ProSe-Uu interface. The core network, the EPC 110, controls the UEs and manages establishment of the bearers, and includes a Mobility Management Entity (HSS) 112, a serving gateway (SGW) 114, a packet data network gateway (PLANT) 116, a Policy and Charging Rules Function (PCRF) 118, a Home subscriber Server (HSS) 120, a ProSe server 122, etc. The ProSe server 122 is further is connected to an application server 124 which may be set in the operator side or the service/application provider side. The MME 112, the SGW 114, and the POW 116 can be implemented in a gateway box. In some embodiments, the SGW 114 and POW 116 can be implemented on separate network devices.

The MME 112 provides mobility management and session management oar UEs by control plane signaling using Non-Access Stratum (NAS) protocols where the NAS packets is transported over S1-MME interfaces bets peen the MME 112 and the eNB 106. The MME 112 and the SGW 114 communicate with each other via a S11 interface. The SGW 114 forwards and receives packets to and from the eNB 106 via an S1-u interface. The S1-u interface supports per-bearer user plane tunneling and inter-eNB path switching during handover.

The POW 116 is connected to an external packet network (e.g., the Internet or operator's IP service center 130) via a SGi interface and is connected to the SGW 114 via an S5 interface. The PGW 116 serves IP address allocation for the UEs, as well as QoS enforcement and flow-based charging according to rules from the PEW 118. The PGW 116 also serves as the mobility anchor for inter-working with non-3GPP technologies such as CDMA2000 and WiMAX networks.

The PORE 118 serves to perform policy control decision-making, as as controlling the flow-based charging functionalities. In addition, the PCRF 118 communicates with the POW 116 via a Gx interface, and with the operator's IP service center 130 via an Rx interface.

The HSS 120 is connected to the MME 112 via an s6a interface and stores subscriber data for each subscriber in the EPS 10. The subscriber data includes ProSe subscription information, related ProSe preference settings, a subscription profile, authentication vectors, and a list of allowed Access Point Names (APNs) for each subscriber. Each APN has a list of allowed PG-Ws for the subscriber. Art APN may be considered as the network name (e.g., Internet, corporate intranet, etc.) associated a particular packet data network (PDN).

The ProSe server 122 communicates with the MME 112 via an Sx interface which transfers ProSe related subscription information in the corresponding PLMN, communicates with the HSS 120 via an Sz interface which transfers ProSe related subscription and authentication data for authenticating/authorizing user access to the ProSe services, and communicates with the application server 124 via an Sy interface. The ProSe server 122 supports ProSe operations and is responsible for ProSe registration, control and authorization, charging and parameterization. For example, the ProSe server 122 authorizes the UE 102 and the UE 104 to use the ProSe service, such as to transmit/receive data or signaling directly with each other and to use any other features provided by the ProSe server 122. For example, a ProSe service can be a ProSe communication, or a ProSe direct discovery.

The application server 124 communicates with the ProSe server 122 for ProSe application user registration (a.k.a. user registration), authorization and control of the third-party application access to the ProSe services, via the Sy interface.

Figure 2:
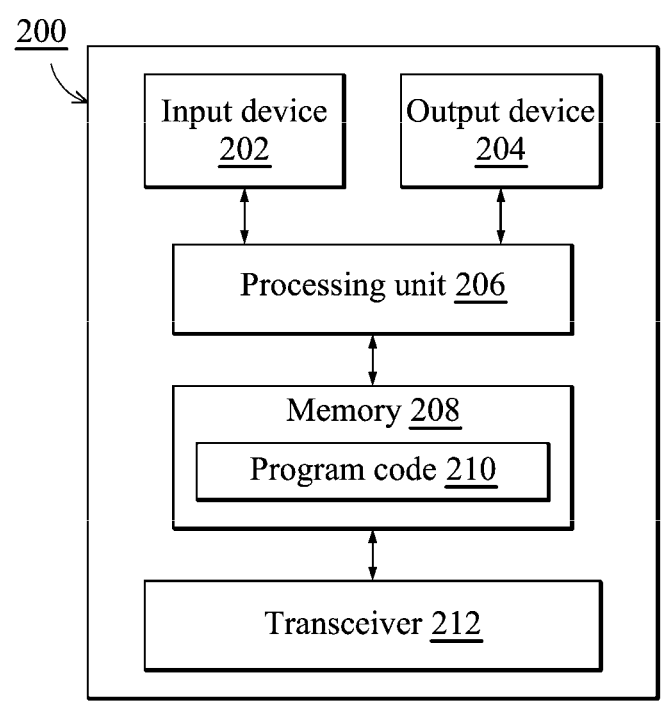
FIG. 2 is a functional block diagram of a communications device according to one embodiment of the present invention.

FIG. 2 is a functional block diagram of a communications device 200 according to one embodiment of the present invention. As shown in FIG. 2, the communication device 200 can be the first UE 102 or the second UE 104, the eNB 106, the MME 112, the ProSe server 122 or the ProSe application server 124 of FIG. 1, and the communications device 200 is preferably used in the LTE system, the LTE-A system or any other similar wireless communications system. The communications device 200 may include an input device 202, an output device 204, a processing unit 206, a memory 208, a program code 210, and a transceiver 212. The processing unit 206 can be a Central Processing Unit (CPU), a microprocessor, or an Application Specific Integrated Circuit (ASIC) which is able to execute the program code 210 in the memory 208 and transmits the processing results of the program code 210 to the transceiver 212 to be transmitted on the air. The communications device 200 can receive signals input by a user through the input device 202, such as a keyboard keypad, touch screen, or microphone (for voice input), and can output images and sounds through the output device 204, such as a screen or speakers. The signal input/output from and to the input device 202 and output device 204 can also be processed by the processing unit 206. The transceiver 212 is used to receive and transmit radio signals under the processing unit 206.

Figure 3:
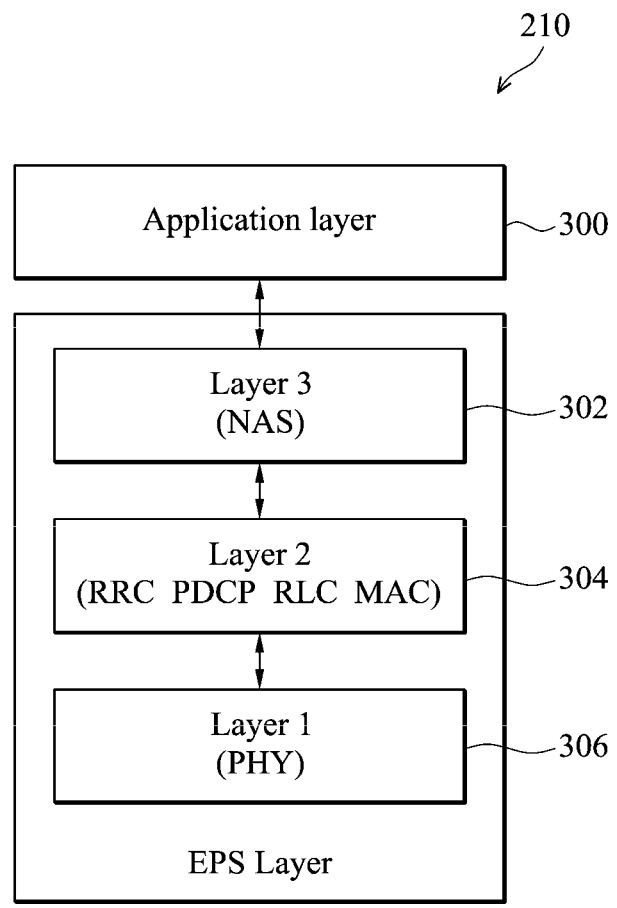
FIG. 3 is a simplified block diagram of the program code shown in FIG. 2 in accordance with one embodiment of the invention.

FIG. 3 is a simplified block diagram of the program code 212 shown in FIG. 2 in accordance with one embodiment of the invention. In this embodiment, the program code 210 is provided in many protocol layers and illustrated in a protocol stack structure, including an application layer 300 (in the user plane), a Layer 3 302 (as a Non Access Stratum (NAS) layer), and a Layer 2 304 (including a Medium Access Control (MAC) layer, a Radio Link Control (RLC) layer, a Packet. Data Convergence Protocol (PDCP) layer) and a Radio Resource Control (RRC) layer), and is coupled to a Layer 1 306 (as a Physical (PRY) layer). The integration of Layers 1 to 3 can be regarded as a whole as an EPS layer. In other words, the program code 310 in the application layer (a.k.a upper layer) can transmitted/received signaling or data to the EPS layer by using LTE/LTE-A technologies; the application layer implements the operations of APP entities, and the EPS layer can implement the operations of the ProSe entity.

The application layer 300 performs signaling/data/media information exchange via user plane messages between the UE and the network. It is required that the UE has IP connectivity with the network. For example, if a user plane interface is applied between a UE and a ProSe server, the UE needs to obtain IP connectivity and then it can start to communicate with ProSe server. The Layer 3 (NAS) 302 handles the mobility management, e.g., to exchange location information and attachment status, and session management and communications between the MME 112 and the UEs by NAS messages.

An LTE communication system may utilize relays to facilitate communication between a UE and an eNB. In an aspect, ProSe communication D2D technology may be utilized for relaying in an LTE communication system. This may include using a public safety UE as a relay, and implementing new relay architecture between a relay UE and an UE which is out of coverage of the eNB.

Figure 4A:
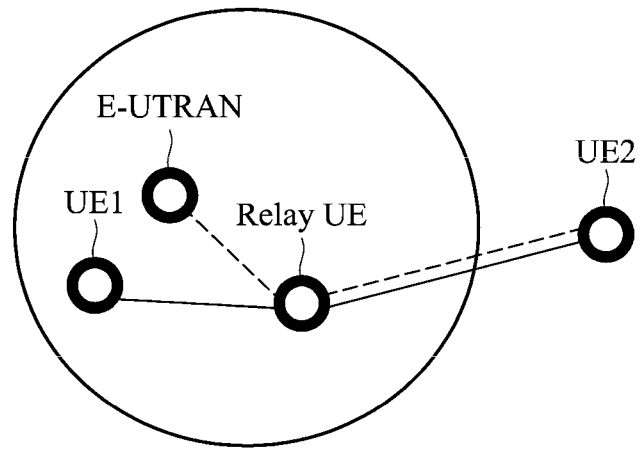
FIGS. 4A-4B illustrates two relay architecture diagrams for the Proximity Services (ProSe) communications according to an embodiment of the present invention.
Figure 4B:
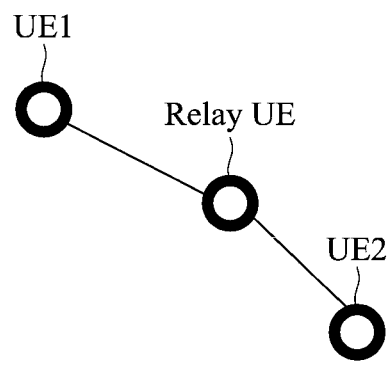

For a public safety ProSe UE acting as a relay, generally called relay UE (or a UE relay the same) in short, it can be a UE-to-Network relay or a UE-to-UE relay. The UE-to-Network relay shall be served by the E-UTRAN. FIGS. 4A-4B illustrates two relay architecture diagrams for the Proximity Services (ProSe) communications according to an embodiment of the present invention. In FIG. 4A, the relay UE may be a UE-to-UE relay or a UE-to-Network relay and the UE which is out of coverage of the E-UTRAN and requires a relay is called a remote UE1 wherein solid lines are ProSe E-UTRA communication paths between a remote UE1 and a remote UE2 via the UE-to-UE relay, and dash lines are ProSe E-UTRA Communication paths between the E-UTRAN and UEs out of coverage of the E-UTRAN via the UE-to-Network relay.

As shown in FIG. 4A, for the relay UE being served by the E-UTRAN, the relay UE can be a UE-to-Network relay to relay ProSe one-to-one or one-to-many communications from the E-UTRAN to the remote UEs out of the coverage of the E-UTRAN or from a remote UE out of the coverage of the E-UTRAN to the E-UTRAN. The network can control an ProSe E-UTRA communication that is relayed by the UE-to-Network relay.

In FIGS. 4A-4B, for the relay UE whether being served by the E-UTRAN, the relay UE can be a UE-to-UE relay to relay the ProSe one-to-one or one-to-many communications for remote UEs that are within its communication range.

To extend the communication range for the public safety, a public safety ProSe UE capable of using a relay function can be configured to act as a relay UE, either the UE-to-UE relay or the UE-to-Network relay. However, when being, a relay UE, the relay UE may consume extra power for the relay discovery procedure and relay communication. Due to the limited battery life, a relay discovery procedure of the relay UE should be activated only when needed. Therefore, the relay UE activates a relay function for relaying the public safety ProSe communication by the following three activation types:

Activation Type 1:

In Activation type 1, there is no relay discovery procedure. The relay function of a relay UE is activated whenever the relay UE has an active ProSe communication with a source UE or the E-UTRAN (or eNB under the E-UTRAN). Activation type 1 would consume more power if there is no UE requiring a relay for communication. However Activation type 1 is suitable for communication in emergency cases or with high priority.

Activation Type 2:

In Activation type 2, the relay UE is regarded as a monitoring UE in the relay discovery procedure, and the relay function can be activated after the relay UE receives an announcing message(s) from a UE requiring a relay. In Activation type 2, whenever there is active ProSe communication, the relay UE keeps periodically monitoring if there is any announcing message (e.g., relay discovery request) from a UE requiring a relay, in the relay discovery procedure. On the other side, for an announcing UE requiring a relay, the announcing UE (i.e., remote UE) may be triggered to perform the relay discovery when it moves out of the communication range of a source UE or when it loses active ProSe communication with the E-UTRAN.

Activation Type 3:

In Activation type 3, the relay UE is regarded as announcing UE in the relay discovery procedure, and the relay function can be activated after the relay UE receives an acknowledge message(s) or a response from a UE requiring a relay. In Activation type 3, whenever there is active ProSe communication, the relay UE announces its existence by periodically transmitting an announcing message (e.g., relay discovery request), in the relay discovery procedure. On the other side, for a monitoring UE requiring a relay (i.e., a remote UE) may also be triggered to perform the relay discovery when it moves out of the communication range of a source UE or when it loses active ProSe communication with the E-UTRAN. Therefore, the relay UE would consume more power for announcement in relay discovery, if there is no UE requiring a relay in proximity.

The following models for ProSe Direct Discovery exist:
Model A ("I am here")
This model defines two roles for the ProSe-enabled UEs that are participating in ProSe Direct Discovery.
    Announcing UE: The UE announces certain information that could be used by UEs in proximity that have permission to discover. Relay UE?
    Monitoring, UE: The UE that monitors certain information of interest in proximity of announcing UEs, Remote UE In this model the announcing UE broadcasts discovery messages at pre-defined discovery intervals and the monitoring UEs that are interested in these messages read them and process them.

Model B ("who is there?"/"are you there?")

This model defines two roles for the ProSe-enabled UEs that are participating in ProSe Direct Discovery.

Discoverer UE: The UE transmits a request containing certain information about what it is interested to discover. Remote UE Discoveree UE: The UE that receives the request message can respond with some information related to the discoverer's request. Relay UE It is equivalent to "who is there/are you there" since the discoverer UE sends information about other UEs that would like to receive responses from, e.g. the information can be about a ProSe Application Identity corresponding to a group and the members of the group can respond.

Figure 5:
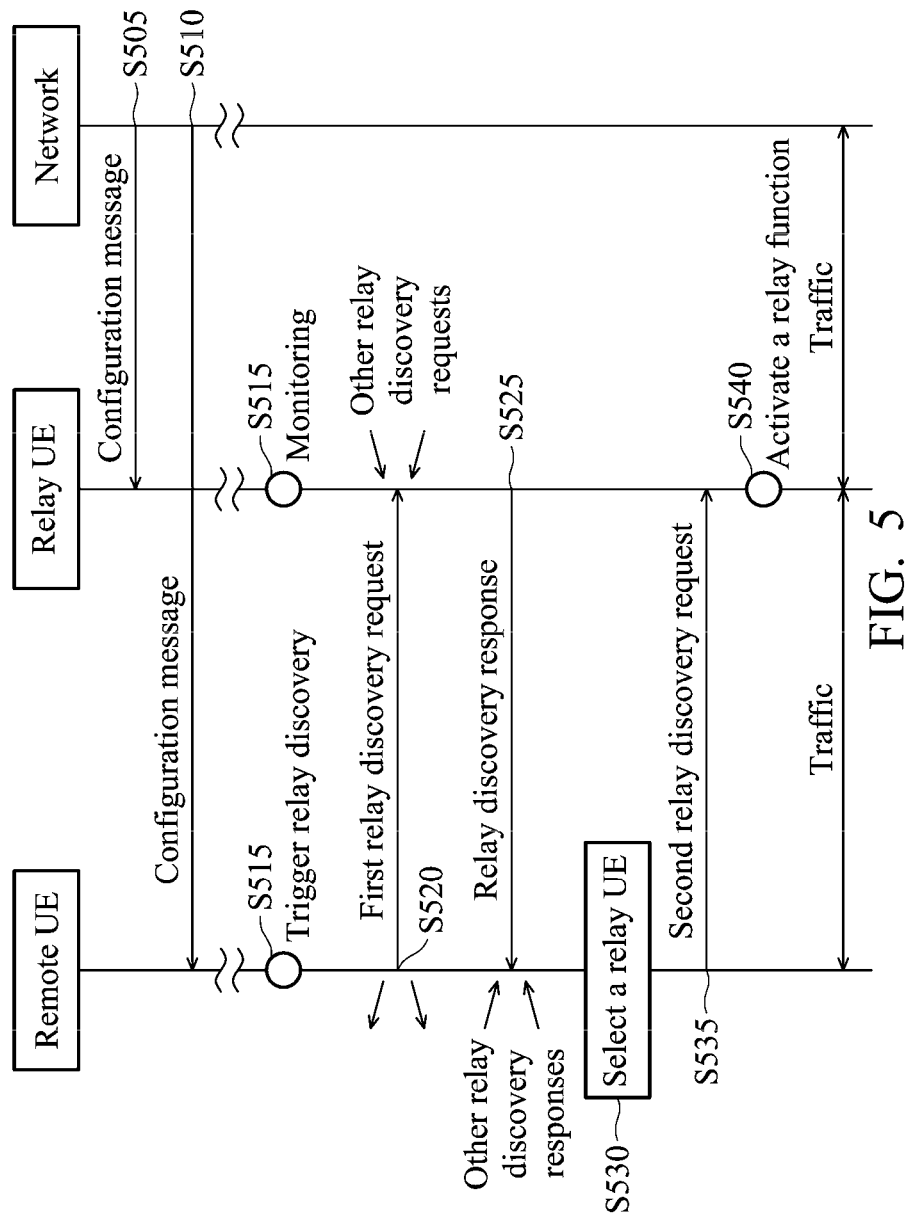
FIG. 5 illustrates a relay discovery procedure performed between a relay UE and a remote UE which requires a relay according to an embodiment of the present invention.

FIG. 5 illustrates a relay discovery procedure performed between a relay UE and a remote UE which requires a relay according to an embodiment of the present invention. The relay discovery procedure of FIG. 5 uses Activation type 2. The relay discovery procedure is associated with steps S515 to S540.

Step S515 is a trigger for relay discovery, respectively for the relay and for the remote UE. On the side of the relay UE, in step S515, the relay UE initiates periodical monitoring operation on detection of a first relay discovery request when the relay UE receives traffic of ProSe communication from a serving network (in its home PLMN) or a source UE (not shown in FIG. 5) or when the relay UE receives session information of ProSe communication, wherein the traffic of ProSe communication can be eMBMS broadcasting communication or EPS bearer services from the network, or the ProSe direct communication service from a peer source UE. For example, if the traffic is received from the network, the UE acts as a UE-to-Network relay in the network coverage. On the other hand, if the traffic is from a peer source UE, the UE acts as a UE to UE relay whether or not the UE is in network coverage or not. Please note that in EPS, out of network coverage means out of E-UTRAN coverage in UE.

Furthermore, for example, if the ProSe communication is a group communication, the session information can include Temporary Mobile Group Identity (TMGI), start/stop time of the group communication, etc., received from the network, and the traffic of the group communication can be received from the network via eMBMS broadcast mechanism by the relay UE. That is, the relay UE can trigger discovery procedure when it receives the session information from the network about the scheduled group communication or when it has started to receives the traffic of the group communication. In former case, the relay UE may or may not be a group member of the group communication.

On the side of the remote UE, in step S515 the remote UE triggers relay discovery when it moves out of the communication range of a source UE or out of coverage of the network, or when it loses active ProSe communication with the network, and in step S520, the remote UE periodically transmits a first relay discovery request, to find out if there any relay UE and to request a discovered relay UE (if exists) for relaying traffic of ProSe communication. For the relay UE, it may receive more than one first relay discovery request from the same remote UE, and may receive other relay discovery requests from other UEs requiring a relay.

In step S525, the relay UE transmits a relay discovery response to the remote UE after the relay UE has received the first relay discovery request(s) from the remote UE. The relay discovery response includes an identification of the relay UE, which is called relay UE ID hereinafter. Please note that, it is predictable that the remote UE may receive at least one relay discovery response from all surrounding relay UE which receives the announcement (i.e., the first relay discovery request) from the UE.

After the remote UE has received at least one relay discovery response, in step S530 the remote UE selects a relay UE among the at least one relays UE which send relay discovery responses, and the selection is performed based on these received relay discovery response(s). The remote UE can recognize different relay OF by the relay UE ID included in the relay discovery response. For example, the remote UE can estimate received signal strength of these received relay discovery responses and select a relay UE with the best signal strength. In another example, the remote UE can select the relay UE by consideration on any other requirement, e.g., to determine if a candidate relay UE has the same group identifier with the remote UE its own.

In another example, the remote UE can determine to select several relay UEs for different use, i.e., each selected relay UE for relaying different type of data or different group communication: and in this situation, the remote UE may transmit relay discovery responses respectively to the selected relay UEs or announce a relay discovery response including relay-UE IDs corresponding to the selected relay UEs.

After the remote UE decides the relay UE, in step S535 the remote transmits a second relay discovery request, including the UE ID of the selected relay UE. The remote UE may transmit the second relay discovery request also by announcement. When the relay UE receives the second relay discovery request, the relay UE recognizes that the second relay discovery request includes the UE ID its own (so as to make sure that there is a UE require a relay in proximity). After the second relay discovery request including relay UE ID is received by the relay UE, in step S540, the relay UE activates the relay function to start relaying traffic of ProSe communication for the remote UE. Note that the traffic of ProSe communication can be eMBMS broadcasting communication, or EPS bearer services from the network, or the ProSe direct communication service from a peer source UE. By the relay discovery procedure shown in FIG. 5, the remote UE can continue the ProSe communication with the source UE or the network via the relay UE. The relay UE uses radio resources dedicated for relaying ProSe communication assigned by the serving network or radio resources indicated in a system information message; otherwise, the relay UE uses preconfigured radio resources instead.

From the above, the relay discovery procedure of FIG. 5 can be described in two aspects, the relay UE and the remote UE. The method in accordance with each aspect of the relay UE is introduced later.

The first relay discovery request in FIG. 5 sent by the remote UE includes at least one of:

a relay-UE indicator, indicating the first relay discovery request is for discovering a relay UE a credential of the remote UE, including configured parameters for the remote UE to use a relay UE for ProSe communication a message type indicating the first relay discovery request is an announcing message, a transmission type indicating broadcast, multicast or unicast that the remote UE request fir relaying;

a media type of the ProSe communication that the remote UE requests for the relay UE, and a group identifier (ID) indicating a requested group communication in which the remote UE has a group membership.

The relay discovery response in FIG. 5 does not only include the relay UE ID but also includes at least one of:

a relay-UE indicator indicating the first relay discovery request is for discovering a relay UE;

a credential of the relay UE, including configured parameters for the UE to act as a relay for ProSe communication, a media type of the ProSe communication that the UE is authorized to relay when being a relay UE, a received communication type, which is the type of traffic of ProSe communication that the UE is currently received from a serving network, and a group identifier (ID) indicating a requested group communication in which the remote UE has a group membership.

Figure 6:
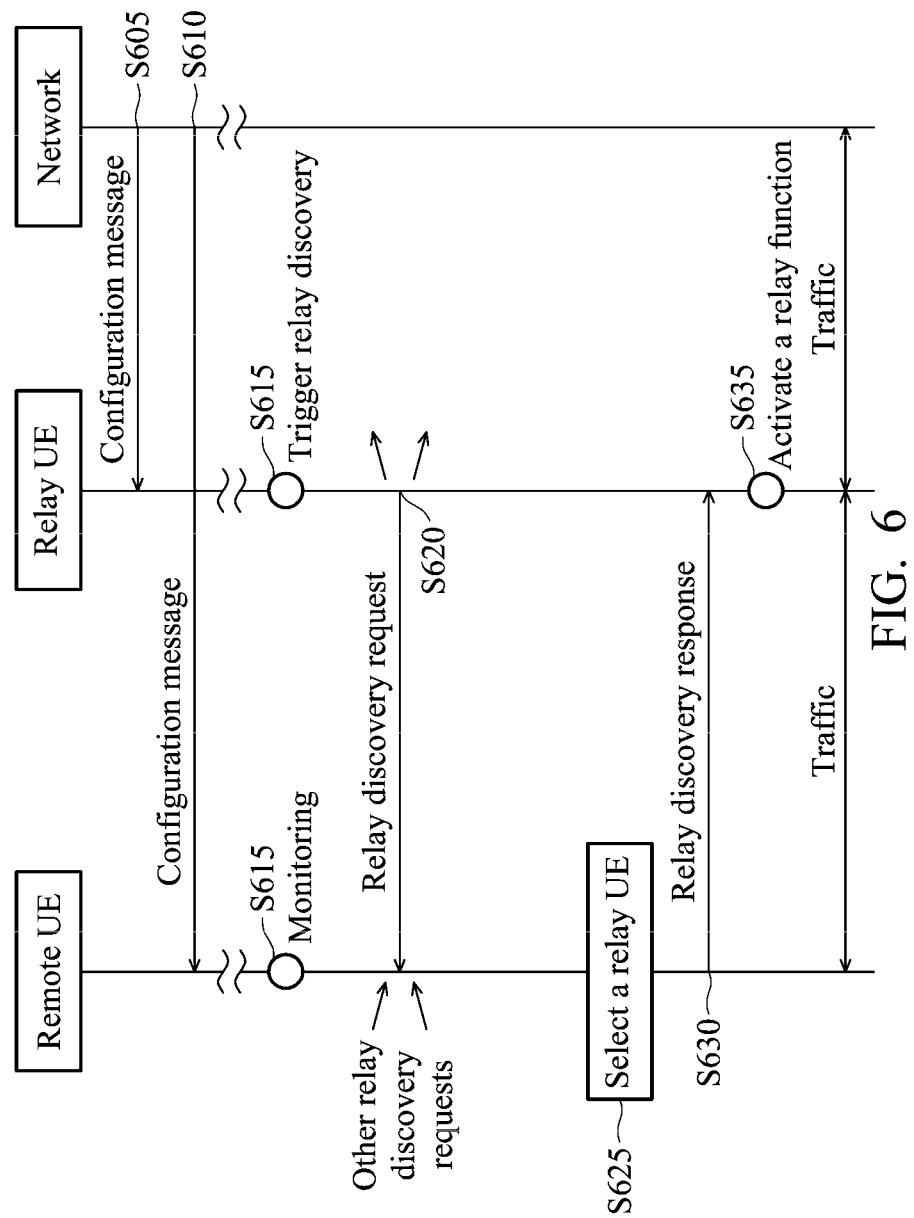
FIG. 6 illustrates a relay discovery procedure performed between a relay UE and a remote UE which requires a relay according to an embodiment of the present invention.

FIG. 6 illustrates a relay discovery procedure performed between a relay UE and a remote UE which requires a relay according to an embodiment of the present invention. The relay discovery procedure of FIG. 6 uses Activation type 3. The relay discovery procedure is associated with steps S615 to S635.

Step S615 is a trigger for relay discovery, respectively for the relay UE and for the remote UE. On the side of the relay UE, in step S615, the relay UE triggers relay discovery when the relay UE receives traffic of ProSe communication from a serving network or a source UE (not shown in FIG. 6) and then perform announcement in step S620, wherein the traffic of ProSe communication can be eMBMS broadcasting communication, or EPS bearer services from the network, or the ProSe direct communication service from a peer source UE. On the side of the remote UE, in step S615 the remote UE triggers relay discovery when it moves out of the communicator range of a source UE or out of coverage of the network, or when it loses active ProSe communication with the network.

In step S620, the relay UE transmits a relay discovery request including its own UE ID (and to the remote UE, this is a relay UE ID), for announcing that it is capable of being a relay. In one example, the relay UE may periodically transmit the relay discovery request. Then, the remote UE may receive the relay discovery request from the relay UE, and may also receive other relay discovery request, from other relay UE which also announces respective relay discovery requests.

After the remote UE has received at least one relay discovery request, in step S625, the remote UE selects a relay UE among the at least one relay UE which send relay discovery requests, and the selection is performed based on these received relay discovery request(s). The remote UE can recognize different relay UE by the relay UE. ID included in the relay discovery request. For example, the remote UE can estimate received signal strength of these received relay discovery requests and select a relay UE with the best signal strength. In another example, the remote UE can select the relay UE by consideration on any other requirement, e.g., to determine if a candidate relay UE has the same group identifier with the remote UE its own.

In another example, the remote UE can determine to select several relay UEs for different use, i.e., each selected relay UE for relaying different type of data or different group communication: and in this situation, the remote UE may transmit relay discovery responses respectively to the selected relay UEs or announce a relay discovery response including relay-UE IDs corresponding to the selected relay UEs.

After the remote UE decides the relay UE, in step S630 the remote UE transmits a relay discovery response, including the UE ID of the selected relay UE. The remote UE may transmit the relay discovery response by announcement. When the relay UE receives the relay discovery response, the relay UE recognizes that the relay discovery response includes the ILE ID its own (so as to make sure that there is a. ILE require a relay in proximity). After the relay discovery response including relay UE ID is received by the relay UE, in step S635, the relay UE activates, the relay function to start relaying traffic of ProSe communication for the remote UE. Note that the traffic of ProSe communication can be eMBMS broadcasting communication, or EPS bearer services from the network, or the ProSe direct communication service from a peer source UE. By the relay discovery procedure shown in FIG. 6, the remote UE can continue the ProSe communication with the source UE or the network via the relay UE. The relay UE uses radio resources dedicated for relaying ProSe communication assigned by the serving network or radio resources indicated in a system information message; otherwise, the relay UE uses preconfigured radio resources instead.

From the above, the relay discovery procedure of FIG. 6 can be described in two aspects, the relay UE and the remote UE. The method in accordance with each aspect of the relay UE is introduced later.

The relay discovery request in FIG. 6 does not only include the relay UE ID but also includes at least one of:

a relay-UE indicator indicating the relay discovery request is for discovering any UE requiring a relay UE, a credential of the relay UE, including configured parameters for the UE to act as a relay for ProSe communication, a message type indicating the first relay discovery request is an announcing message, a transmission type indicating broadcast, multicast or unicast that the request for relaying;

a media type of traffic of ProSe communication that the relay UE is currently received from the network, and a group identifier (ID) indicating a group communication in which the relay UE has a group membership and the relay UE can support.

The relay discovery response in FIG. 6 does not only include the relay UE ID but also includes at least one of:

a relay-UE indicator indicating the first relay discovery request is for discovering any UE requiring a relay UE a credential of the UE, including configured parameters for the UE to act as a relay for ProSe communication, a media type of the ProSe communication that the remote UE requests for relaying from the relay UE, and a group identifier (ID) indicating a requested group communication in which the remote UE has a group membership.

Please note that, steps S505 and S510 shown in FIG. 5 or in similar steps S605 and S610 shown in FIG. 6 are related to a method of UE configuration. In steps S505 and S510, the network transmits a configuration message to each UE, which is a message dedicated to the UE and indicates that UU is authorized to be a UE-to-Network relay or UE-to-UE relay for relaying traffic for another UE. Note that the network can obtain information from UEs to know which UE is capable of being a relay. The configuration message includes a group identifier, which identifies that a relay UE and a UE requiring a relay to be a monitoring UE or an announcing UE in a specific group with the group identifier (ID). The configuration message further includes an activation type, e.g., the aforementioned Activation Types 1-3, which identifies that a relay UE to be a monitoring UE or an announcing UE in the specific group with the group ID.

That is, the relay UE acting as the monitoring UE and the remote UE acting as the announcing UE in the relay discovery procedure of FIG. 5 are respectively configured by the dedicated configuration messages from the network; also, the relay IT acting as the announcing UE and the remote UE acting as the monitoring UE in the relay discovery procedure of FIG. 6 are respectively configured by the dedicated configuration messages from the network.

The configuration message also includes resources and parameters for the UE, to use in the relay discovery procedure.

Therefore, each UE capable of being a relay may receive the configuration message from the network and uses group ID and/or the resources and parameters for performing the relay discovery procedure. The configuration message can be a message using OMA-DM (Open Mobile Alliance Device Management) protocol or a NAS (Non Access Stratum) message using E-UTRA protocol. In another example, UEs can uses radio resources indicated in the broadcast system information message from the network, instead.

In another example of the invention, relay UE (or called UE-relay) configuration can be performed as follows.

In support of public safety ProSe communication, including ProSe broadcast communication and ProSe Group communication, whether or not in coverage or out of coverage a public safety UE is configured with authorized broadcast/multicast group identifiers. For a public safety UE capable of being a UE-Relay user to request relay service and/or being a UE-Relay to provide relay service, it is authorized/configured by the network via OMA-DM to enable corresponding capabilities as well as the authorized public safety ProSe communication. Furthermore, according to the operator policies, UEs need to be configured with the same IT-relay activation type in relay discovery procedure.

In one example, the configuration of a public safety UE may include at least one of the following information:
   UE-Relay user capability enabling
      Credential for using UE-Relay (note that it is for future study for SA3 if common credential for Relay access can be used by all of the UEs.
      UE-relay activation type in UE-relay discovery procedure
   UE-Relay capability enabling
      UE-to-Network capability enabling
      UE-relay activation type in UE-relay discovery procedure
   Authorized group identifier for relay
      Broadcast/Multicast mode
      Emergency or Priority level
      associated radio resource profile in UE-relay discovery procedure and UE-relay Public Safety ProSe communication.

In another example, the configuration of a public safety UE may include at least one of the following information:
   UE-Relay user capability enabling
      Authorized group identifier
      Broadcast/Multicast mode
      Emergency or Priority level
      associated credential
      associated APN
      associated UE-relay activation type in UE-relay discovery procedure
      associated radio resource profile in UE-relay discovery procedure
      associated radio resource profile in UE-relay Public Safety ProSe communication;
   Relay capability enabling
      UE-to-Network capability enabling
      Relaying public safety ProSe communication capability enabling
      Authorized group identifier
      Broadcast/Multicast mode
      Emergency or Priority level.
      associated APN
      associated credential
      associated UE-relay activation type in UE-relay discovery procedure
      associated radio resource profile in UE-relay discovery procedure
      associated radio resource profile in UE-relay Public Safety ProSe communication.

As the above, in the relay discovery procedure in FIG. 5 and FIG. 6, the relay UE activating the relay function is determined by the UE requiring a relay. In another embodiment of the present invention, the relay UE can be determined by the network, either.

Figure 7:
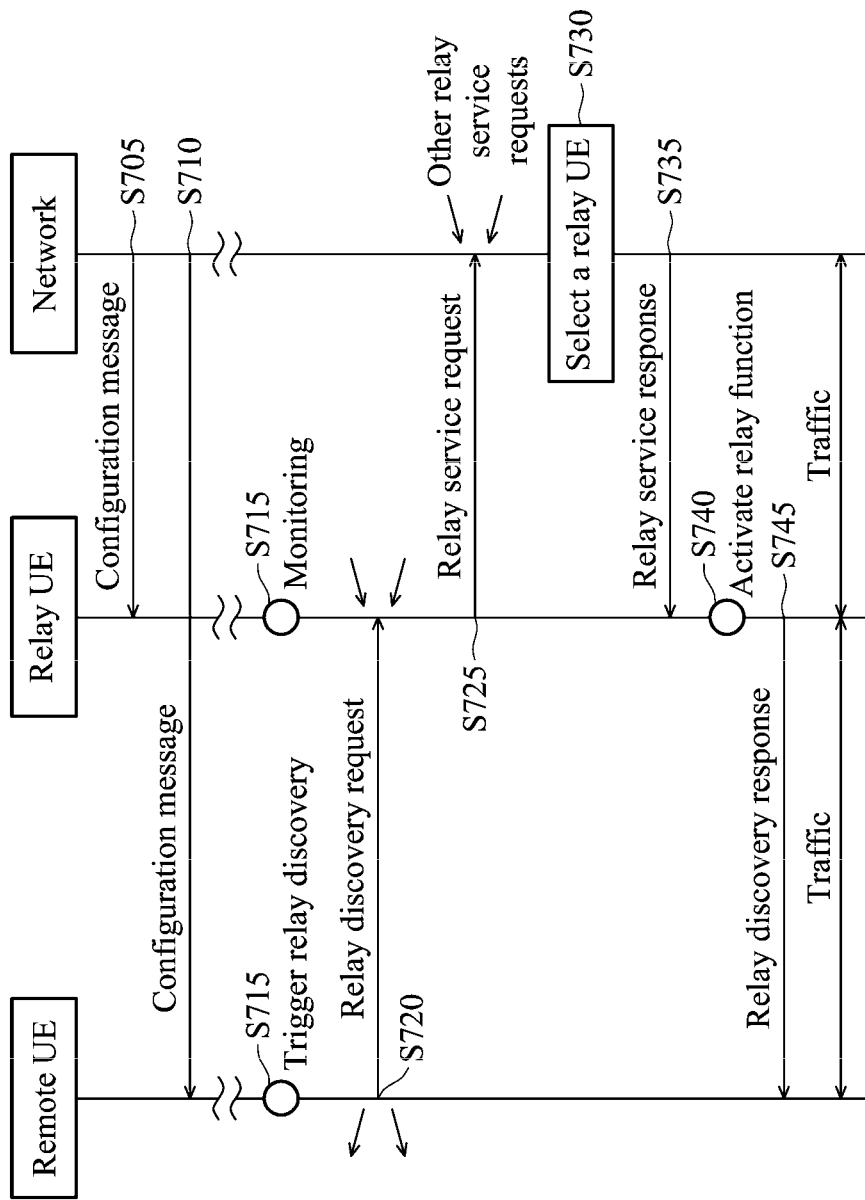
FIG. 7 illustrates a relay discovery procedure performed by a network, a relay UE, and a remote UE requiring a relay according to an embodiment of the present invention.

FIG. 7 illustrates a relay discovery procedure performed by a network, a relay UE, and a remote UE requiring a relay according to an embodiment of the present invention. The relay discovery procedure of FIG. 7 uses Activation type 2. The relay discovery procedure is associated with steps S715 to S740.

Step S715 is a trigger for relay discovery, respectively for the relay UE and for the remote UE. On the side of the relay UE, in step S715 the relay UE initiates periodical monitoring operation on detection of a relay discovery request when the relay UE receives traffic of ProSe communication from a serving network (in its home PLAIN) or a source UE (not shown in FIG. 7), wherein the traffic of ProSe communication can be eMBMS broadcasting communication, EPS bearer services from the network, or the ProSe direct communication service from a peer source UE. On the side of the remote UE, in step S715 the remote OF triggers relay discovery when it moves out of the communication range of a source UE or out of coverage of the network, or when it loses active ProSe communication with the network, and in step S720, the remote UE periodically transmits a first relay discovery request, including a UE ID of the remote UE, to find out if there any relay UE and to request a discovered relay UE (if exists) for relaying traffic of ProSe communication. For the relay UE, it may receive more than one first relay discovery request from the same remote UE, and may receive other relay discovery requests from other UEs requiring a relay.

In step S725, the relay UE transmits a relay service request to the network, after the relay UE has received the relay discovery request(s) from the remote UE. The relay service request includes an UE ID of the relay UE its own and the UE ID of the remote UE included in the relay discovery request. It is predictable that the network may receive at least one relay service request from those relay UEs which receive the announcement (i.e., the relay discovery request) by the remote UE.

After the network has received at least one relay service request, in step S730 the network selects a relay UE among the at least one relay UE which send relay service requests, and the selection is performed based on these received relay service request(s). The network can recognize different relay UE by the relay UE ID included in the relay discovery response. For example, the network estimate received signal strength of these received relay service requests and selects a relay UE with the best signal strength. In another example, the network can select the relay UE by consideration on any other requirement, e.g., group identifier.

After the network decides the relay UE, in step S735 the network transmits a relay service response to the selected relay UE, including the UE ID of the selected relay UE. Note that the relay service response may indicate acceptance or rejection to the relay service. After the relay UE receives the relay service response indicating acceptance to the relay service, in step S740, the relay UE activates the relay function to start relaying traffic of ProSe communication for the remote UE which announces relay discovery requests. Note that the traffic of ProSe communication can be eMBMS broadcasting communication or EPS bearer services.

In another example, when the network determines that a relay UE which transmits a relay service request to not to act as a relay or the network determines that the relay UE is not authorized, the network transmits a relay service response indicating rejection to the relay service to the unselected relay UE.

Furthermore, after the relay UE receives the relay service response indicating acceptance to the relay service and activates the relay function, in step S745 the relay UE may transmit a relay discovery response to the remote UE. The relay discovery response is utilized for the remote UE to synchronize with the UE.

The relay discovery request(s) in FIG. 7 can be a Primary Synchronization al (PSS), Secondary Synchronization Signal (SSS), or a random access preamble. The relay discover, request can be used by the relay UE to synchronize with the remote UE. T Any other signal or message which makes the relay UE recognize the arriving time of the relay discovery request can be used instead. The relay discovery request(s) may be transmitted periodically or several times, and the period or the interval between transmissions can be determined by the relay UE. The relay discovery request(s) can be transmitted on radio resources (e.g. in terms of time and frequency) selected from a pre-defined set of resources.

The relay service request(s) transmitted to the network FIG. 7 comprises at least one of a first index indicating which relay discovery request from a remote UE is received by the relay UE, a second index indicating which relay discovery response is used for the relay UE to respond to the relay discovery request, and a period or timing information that the relay UE receives the relax discovery requests. These indices can be sequence/seed in the relay discovery request. In addition, the relay service request can request resources and parameters for the relay UE to respond to the remote UE, and/or request resources and parameters for future ProSe communications between the relay UE and remote UE, such as a D2D-RNTI of the relay UE or the remote UE.

The relay service response from the network to the relay UE in FIG. 7 can indicate resources and parameters for the relay UE to transmit the relay discovery response to the remote UE, and/or resources and parameters for ProSe communications between the relay UE and remote UE.

The relay discovery response from the relay UE to the remote UE in FIG. 7 is utilized for the remote UE to synchronize with the relay UE. In another example, the relay discovery response is not only be used as a synchronization signal but also indicate the resources and parameters for the remote UE to decode upcoming messages which indicates resources and para peters for ProSe communication between the relay UE and remote UE. In another example, relay discovery response can be transmitted periodically or ore than one times.

In one example, when the relay UE has received a plurality of relay discovery requests, the UE can determine to respond to one of these relay discovery requests, to the remote UE. The relay discovery request to be responded is determined based on the received discovery requests.

Figure 8:
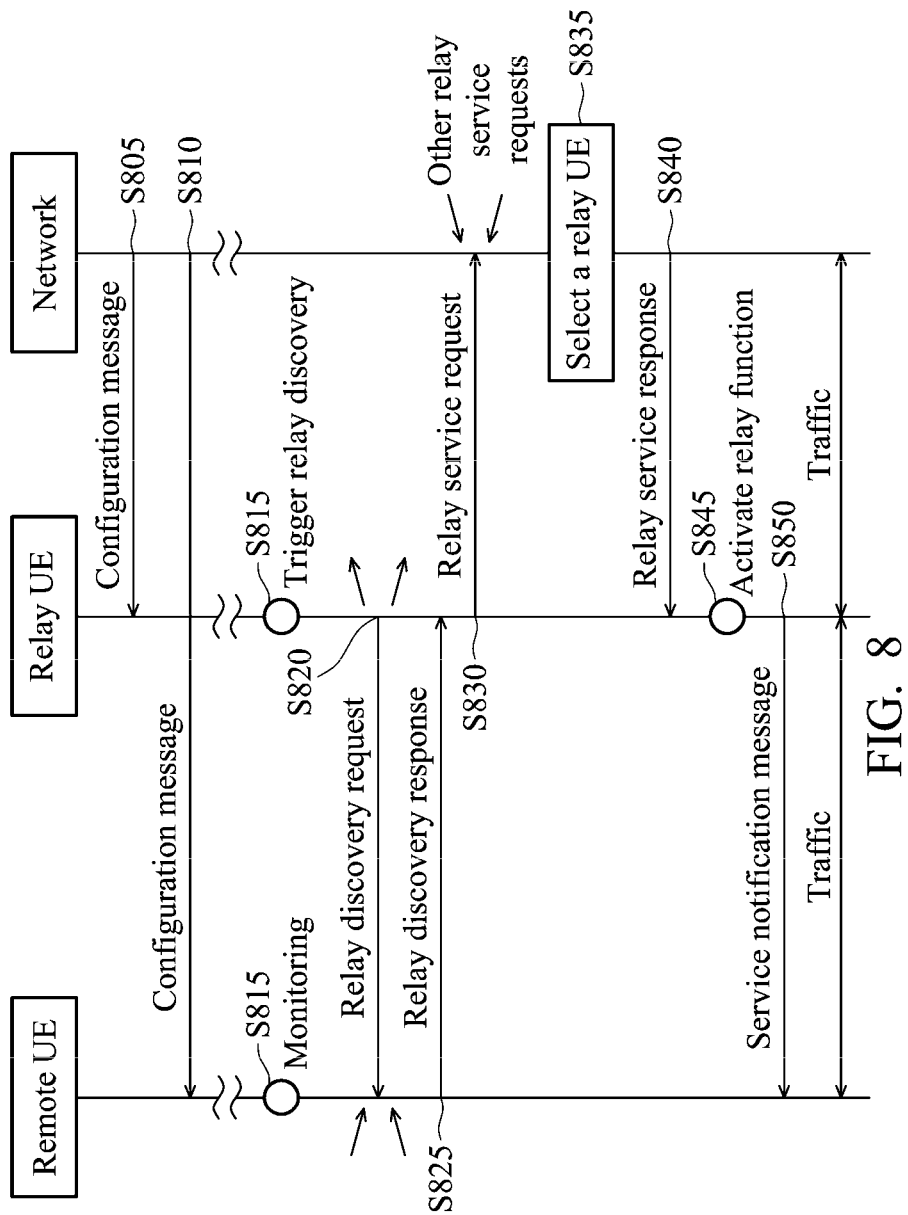
FIG. 8 illustrates a relay discovery procedure performed by a nets cork, a relay UE, and a remote UE requiring a relay according to an embodiment of the present invention.

In addition, FIG. 8 illustrates a relay discovery procedure performed by a network, a relay UE, and a remote UE requiring a relay according to an embodiment of the present invention. The relay discovery procedure of FIG. 8 uses Activation type 3. The relay discovery procedure is associated with steps S815 to S845.

Step S815 is a trigger for relay discovery, respectively for the relay UE and for the remote UE. On the side of the relay UE, in step S815, the relay UE triggers relay discovery when the relay UE receives traffic of ProSe communication from a serving network or a source UE (not shown in FIG. 8) and then perform announcement in step S820, wherein the traffic of ProSe communication can be eMBMS broadcasting communication or EPS bearer services. On the side of the remote UE, in step S615, the remote UE triggers relay discovery when it moves out of the communication range of a source UE or out of coverage of the network, or when it loses active ProSe communication with the network.

In step S820, the relay UE transmits a relay discovery request including its own UE ID (and to the remote UE, this is a relay UE ID), for announcing that it is capable of being a relay. The relay UE may periodically transmit the relay discovery request, or repeatedly (but not periodically) transmit the relay discovery request for several times or thr a time interval. After remote UE receives the relay discovery request from the relay UE, in step S825 the remote UE transmits a relay discovery response including the UE ID of the remote UE by announcement.

Note that the remote UE may also receive other relay discovery requests from other relay UEs which also announces respective relay discovery requests, but the remote UE just responds to all the relay UEs which the remote UE receives the relay discovery requests from, without selecting one among them.

After the relay UE receives the relay discovery response, in step S830, the relay UE transmits a relay service request to the network. The relay service request includes the UE ID of the relay UE and the UE ID of the remote UE. It is predictable that the network may receive at least one relay service request from those relay UEs which receive the relay discovery responses from the remote UE.

After the network has received at least one relay service request, in step S835 the network selects a relay UE among the at least one relay UE which send relay service requests, and the selection is performed based on these received relay service request(s). The example for the network selection is similar to the example of FIG. 7 and omitted herein.

After the network decides the relay UE, in step S840 the network transmits a relay service response to the selected relay UE, including the UE ID of the selected relay UE. After the relay UE receives the relay service response indicating acceptance to the relay service, in step S845, the relay UE activates the relay function to start relaying traffic of ProSe communication for the remote UE. Note that the relay service response may indicate acceptance or rejection to the relay service, referred to as mentioned in the descriptions of FIG. 7.

Furthermore, after the relay UE receives the relay service response indicating acceptance to the relay service and activates the relay function, in step S850 the relay UE may transmit a service notification message to the remote UE. The service not message is utilized for the remote UE to synchronize with the UE.

The relay discovery request(s) in FIG. 8 sent by the relay UE can be a Primary Synchronization Signal (PSS), Secondary Synchronization Signal (SSS), or a random access preamble for the remote UE to synchronize with the relay UE. Any other signal or message which makes the relay UE recognize the arriving time of the relay discovery request can be used instead. The relay discovery request can indicate resources and parameters for the remote UE to respond to. The relay discovery request(s) may be transmitted periodically or several times, and the period or the interval between transmissions can be determined by the relay UE. The relay discovery request(s) can be transmitted on radio resources (e.g. in terms of time and frequency) selected from a pre-defined set of resources.

The relay service request in FIG. 8 comprises a first index indicating which relay discovery request from a remote UE is received by the relay UE. In another example, the relay service request can request for resources and parameters for future ProSe communications between the relay UE and the remote UE.

The relay service response from the network to the relay UE in FIG. 8 can indicate resources and parameters for the relay UE to respond to the remote UE, and/or indicate resources and parameters for ProSe communications between the relay UE and remote UE.

The service notification message from the relay UE to the remote UE in FIG. 8 is utilized for the remote UE to synchronize with the relay UE. In another example, the service notification message is not only be used as a synchronization signal but also indicate the resources and parameters thr the remote UE to decode upcoming messages which indicates resources and parameters for ProSe communication between the relay UE and remote UE. In another example, the service notification message can be transmitted periodically or more than one times.

Please note that, steps S705 and S710 shown in FIG. 7 and steps S805 and S810 shown in FIG. 8 are related to a method of network configuration and are the same as S505 and S510 also shown in FIG. Any other example and detail description can be referred as the above and omitted herein.

There are two examples below for the method for relay discovery and communication of the invention.

Example 1

Considering a case in which 2 sets of random access sequences is assigned specifically for a first announcement message in device-to-device communications, and thus the sequences can be named as D2D random access sequences. The first set has 10 sequences while the second set has 100 sequences, and each sequence of the first set has a period and corresponds to 10 sequences in the second set, wherein each of the 10 sequences denotes a combination of D2D-S-RNTI.

When an announcing UE which is out of the coverage of the network wants to connect to the network, the announcing UE selects a D2D random access sequence from the first set and use it to transmit a first announcement message with 10 ms period and minimum system bandwidth (i.e., 6 RBs, 1.08 MHZ).

When a Relay UE which is in the coverage of the network receives a random access preamble, the Relay UE estimates the D2D timing advance for this D2D random access preamble. The Relay UE can also find the period of the received D2D random access preamble and determine the future sub-frames which would be interface by this random access preamble.

The Relay UE then reports to the network to notice the reception of the first announcement message (e.g., index of the first announcement message), and to indicate the future sub-frame(s) which would be collided by the first announcement message. The Relay UE asks the network to configure the first announcement message for the Relay UE to respond and the sub-frame(s) on which the first announcement message is transmitted. The responding first announcement message is selected according to the received first announcement message and the D2D-S-RNTI to be used to encode further message. It means the Relay UE can understand the D2D-S-RNTI from the received first announcement message and use it to encode the message(s) to the announcing UE. The Relay UE also asks the network to configure the time/frequency resources for the message(s), and time frequency resources, D2D-Relay UE RNTI and D2D-announcing UE RNTI for the future D2D communications between the Relay UE and the announcing UE.

The network then transmits a response message to the Relay UE to indicate the required information, and the Relay UE transmits a discovery signal message to the announcing UE. When the announcing UE receives the discovery signal message, the announcing UE can find the D2D-S-RNTI indicated by the discovery signal message. The Relay UE then transmit the message(s) on the set of resource configured by the network, which includes the D2D timing advanced of the announcing UE, the time/frequency resources, D2D-Relay UE RNTI and D2D-announcing UE RNTI for the future D2D communications between the Relay UE and the announcing UE. Finally, the announcing UE may decode the message by the D2D-S-RNTI.

Example 2

Considering a case in which 2 sets of random access sequences is assigned specifically for an announcement message in device-to-device communications, and thus the sequences can be named as D2D random access sequences. Both sets have 10 sequences and there is a one-one map between sequences in the 2 sets. Every sequence in the first set has a period and corresponds to a combination of D2D-S-RNTI and a set of time/frequency resources (with a period and offset).

When the monitoring UE which is out of the coverage of the network wants to connect to the network, the monitoring UE monitors the 6 radio resource blocks (RBs) in the center of the system bandwidth.

The relay UE which is in the network coverage transmits a periodic announcement message with 10 ms period and on the 6 RBs in the center of system bandwidth. The announcement message is based on a random access sequence in the first set and thus denotes a combination of D2D-S-RNTI and a set of time/frequency resources (with a period and offset). The set of time/frequency resources (with a period and offset) is for the received UEs to respond the announcement message is configured by the network.

The announcing UE receives the announcement message from the Relay UE and responds by another announcement message, which is based on the random access sequence in the second set corresponding to the random access sequence in the received announcement message. The responding announcement message is transmitted on the set of time/frequency resources indicated by the received announcement message.

When the Relay UE receives the responding announcement message, the Relay UE estimates the D2D timing advance and sends a report message to the network to notice the reception of the announcement message (e.g., index of the discovery signal) and require the response time/frequency resources. The Relay UE also asks the network to configure the time/frequency resources, D2D-Relay RNTI and D2D-monitoring UE RNTI for the future D2D communications between the Relay UE and the monitoring UE.

The network then transmits the required information and a first message to the Relay UE, the first message is used to initiate a second message from the Relay UE to the monitoring UE on the set of the response resources. The second message indicates the time/frequency resources, D2D-Relay UE RNTI and D2D-monitoring UE RNTI for the future D2D communications between the Relay UE and the monitoring UE, and is encoded by the D2D-S-RNTI.

Finally, the monitoring UE monitors the second message and decodes it by the D2D-S-RNTI to obtain the D2D-Relay UE RNTI and D2D-monitoring UE RNTI for the future D2D communications between the Relay UE and the monitoring UE.

In addition, the processing unit 206 in FIG. 2 could execute the program code 210 to perform any one of the above-described processes in FIG. 9-15 and examples, or others described herein.

Figure 9:
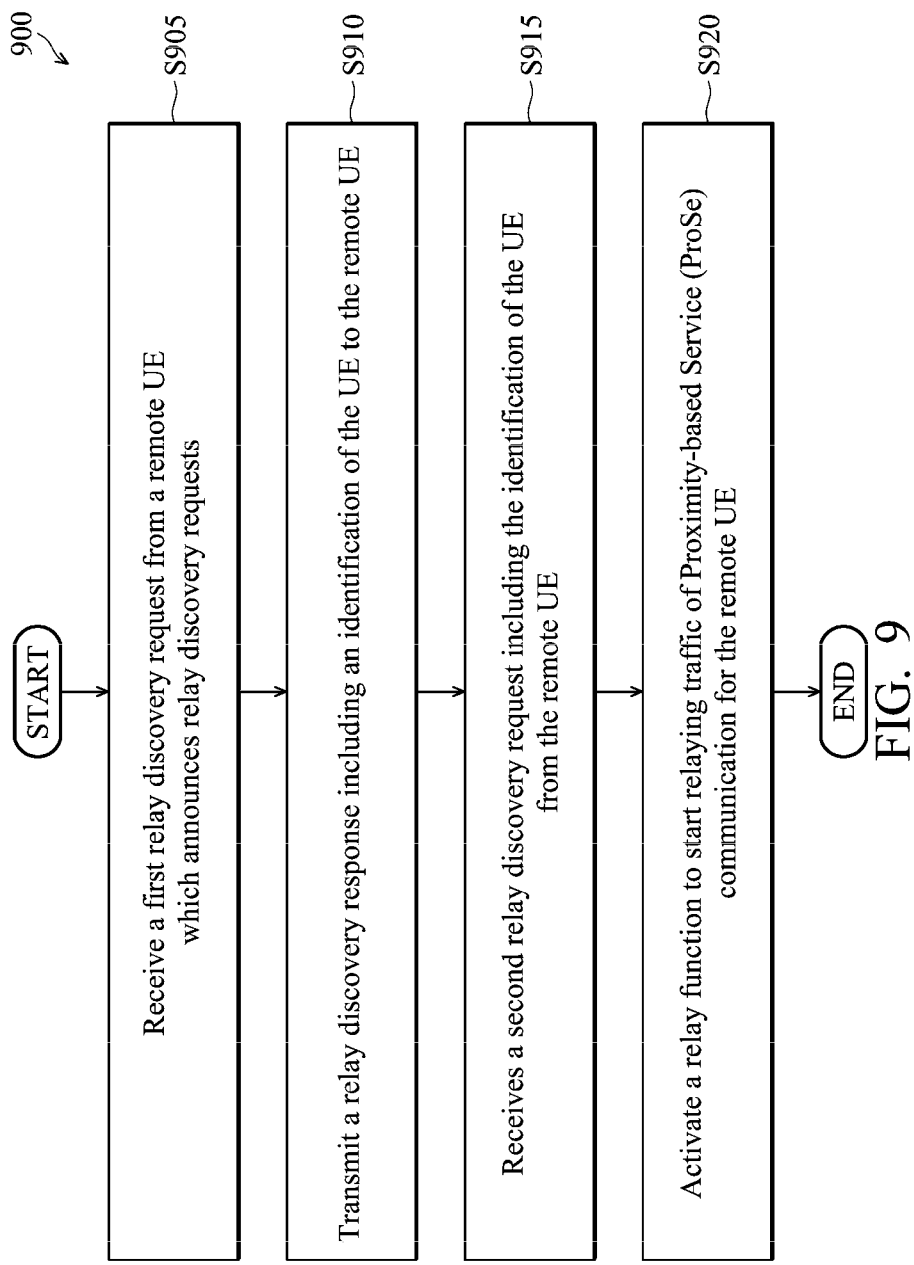
FIG. 9 is a flow chart of a process illustrating a method of relay discovery and communication in a wireless communications system according to an embodiment of the invention with reference to the system in FIG. 5.

FIG. 9 is a flow chart of a process 900 illustrating a method of relay, discovery a Id communication in a wireless communications system according to an embodiment of the invention with reference to the system in FIG. 5. The process 900 is used in a UE such as the relay UE in FIG. 5.

In step S905, the UE receives a first relay discovery request from a remote UE which announces relay discovery requests. In the step S910, the UE transmits a relay discovery response including an identification of the UE to the remote UE. Then, in step S915, the UE receives a second relay discovery request including the identification of the UE from the remote UE. In step S920, the UE activates a relay function to start relaying traffic of Proximity-based Service (ProSe) communication for the remote UE.

Figure 10:
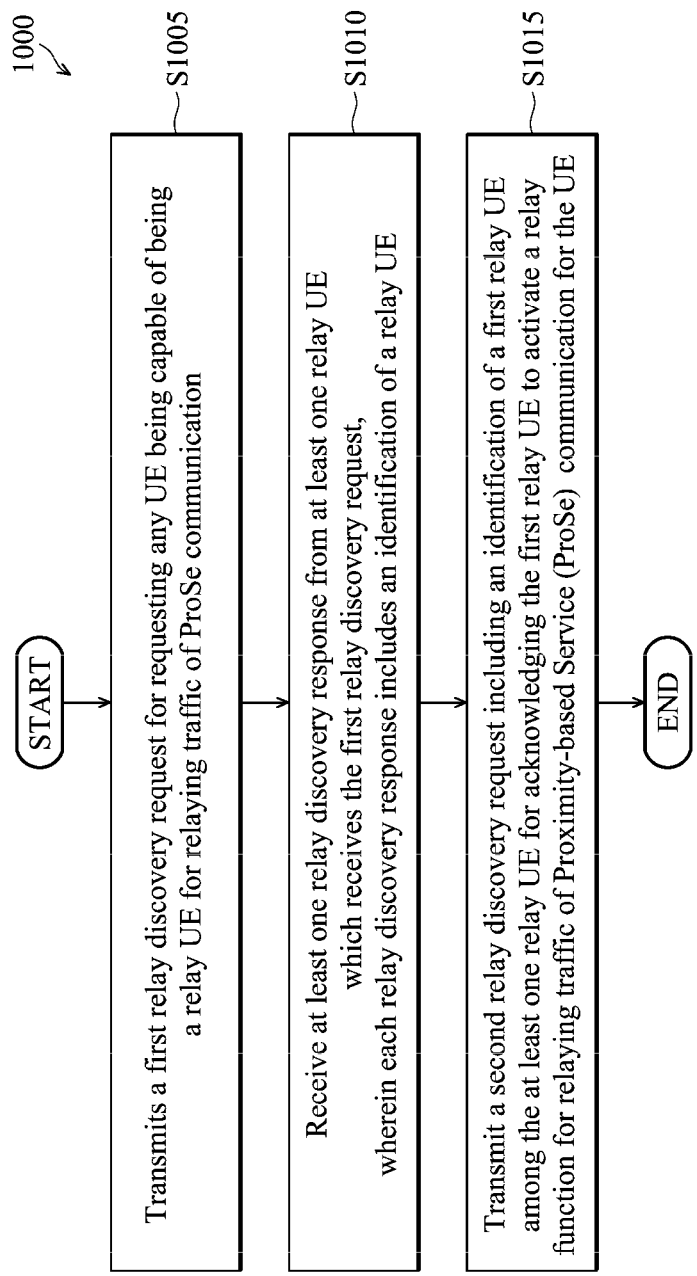
FIG. 10 is a flow chart of a process illustrating a method of relay discovery and communication in a wireless communications system according to an embodiment of the invention with reference to the system in FIG. 5.

FIG. 10 is a flow chart of a process 1000 illustrating a method of relay discovery and communication in a wireless communications system according to an embodiment of the invention with reference to the system in FIG. 5. The process 1000 is used in an user equipment (UE) such as the remote UE in FIG. 5.

In step S1005, the UE transmits a first relay discovery request for requesting any UE being capable of being a relay UE for relaying traffic of ProSe communication. Then, in step S1010, the UE receives at least one relay discovery response from at least one relay UE which receives the first relay discovery request, wherein each relay discovery response includes an identification of a relay UE. In step S1015, the UE transmits a second relay discovery request including an identification of a first relay UE among the at least one relay UE for acknowledging the first relay UE to activate a relay function for relaying traffic of Proximity-based Service (ProSe) communication for the UE.

Figure 11:
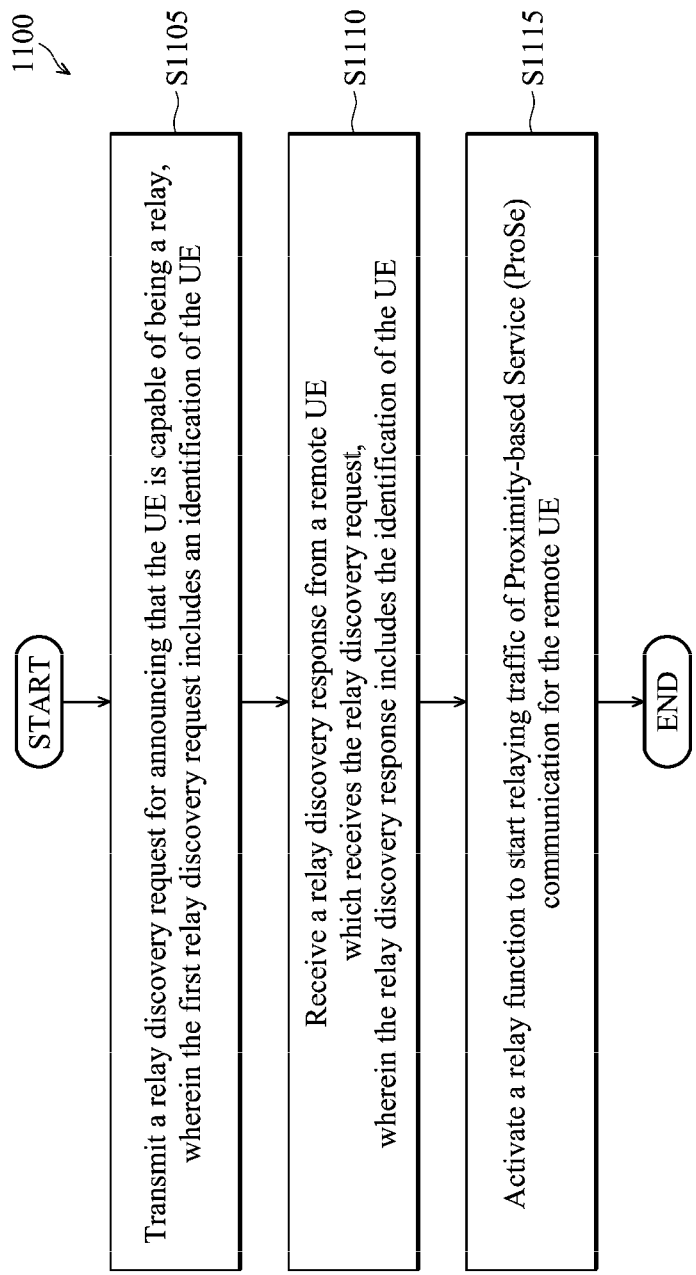
FIG. 11 is a flow chart of a process illustrating a method of relay discovery and communication in a wireless communications system according to an embodiment of the invention with reference to the system in FIG. 6.

FIG. 11 is a flow chart of a process 1100 illustrating a method of relay discovery and communication in a wireless communications system according to an embodiment of the invention with reference to the system in FIG. 6. The process 1100 is used in an user equipment (UE) such as the relay UE in FIG. 6.

In step S1105, the UE transmits a relay discovery request for announcing that the UE is capable of being a relay, wherein the first relay discovery request includes an identification of the UE. Then, in step S1110, the UE receives a relay discovery response from a remote UE which receives the relay discovery request, wherein the relay discovery response includes the identification of the UE. In step S1115, the UE activates relay function to start relaying traffic of Proximity-based Service (ProSe) communication for the remote UE.

Figure 12:
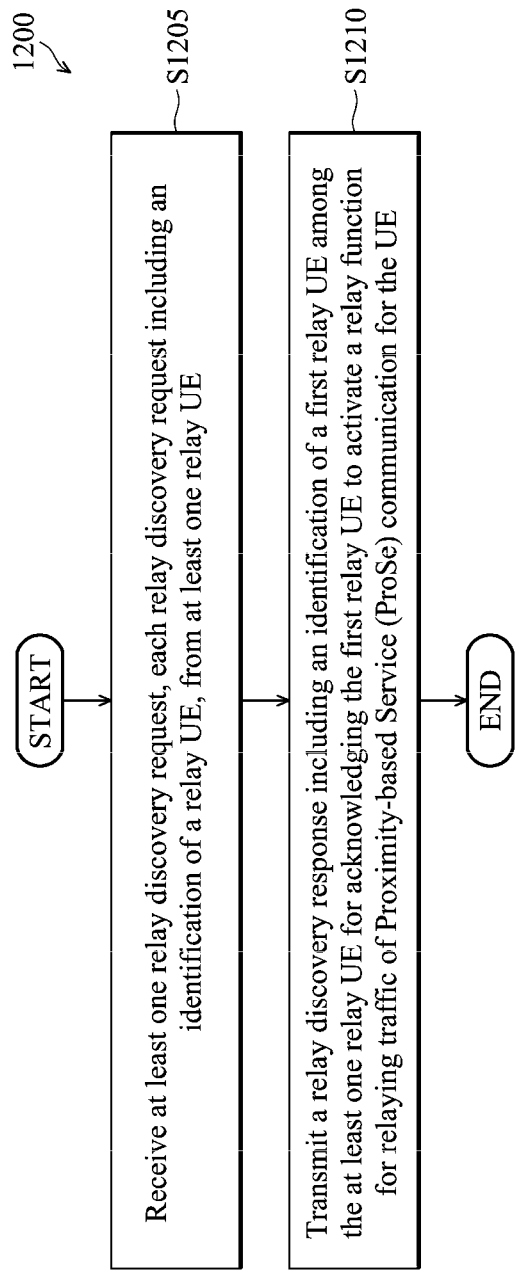
FIG. 12 is a blow chart of a process illustrating a method of relay discovery and communication in a wireless communications system according to an embodiment of the invention with reference to the system in FIG. 6.

FIG. 12 is a flow chart of a process 1200 illustrating a method of relay discovery and communication in a wireless communications system according to an embodiment of the invention with reference to the system in FIG. 6. The process 1200 is used in an user equipment (IT) such as the remote UE in FIG. 6.

In step S1205, the UE receives at least one relay discovery request, each relay discovery request including an identification of a relay UE, from at least one relay UE. In step S1210, the UE transmits a relay discovery response including an identification of a first relay UE among the at least one relay UE for acknowledging the first relay UE to activate a relay function for relaying traffic of Proximity-based Service (ProSe) communication for the UE.

Figure 13:
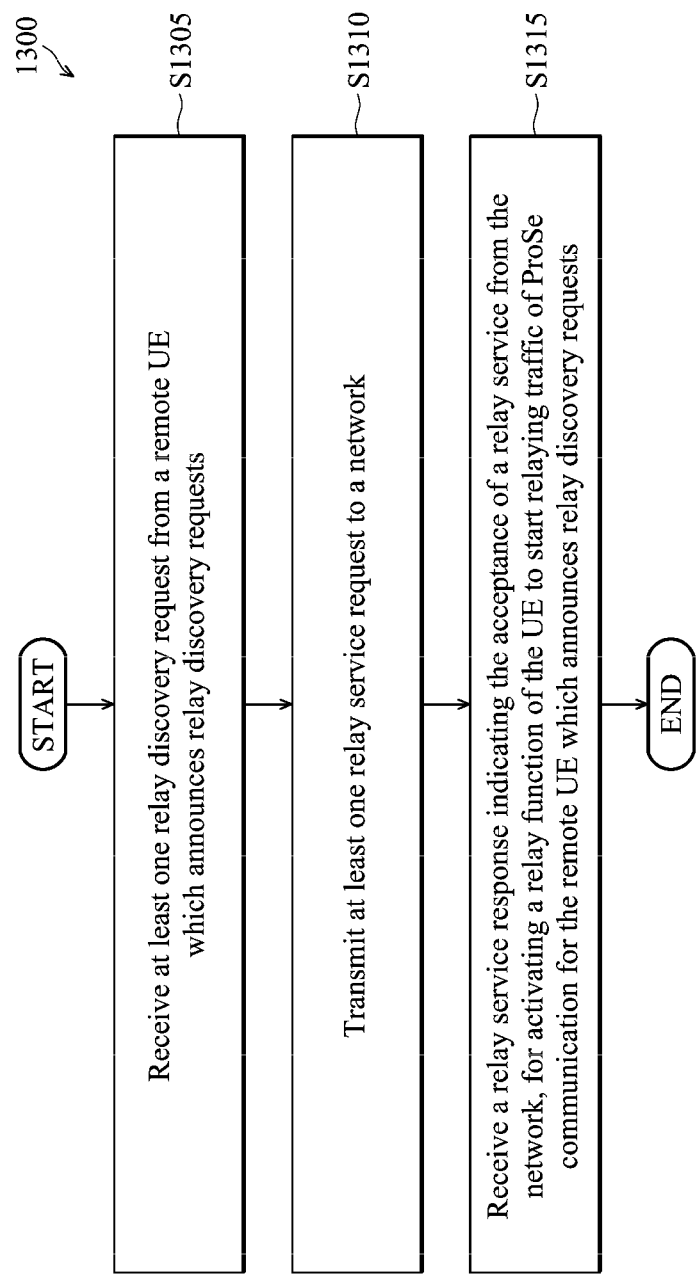
FIG. 13 is a flow chart of a process illustrating a method of relay discovery in a wireless communications system according to an embodiment of the invention with reference to the system in FIG. 7.

FIG. 13 is a flow chart of a process 1300 illustrating a method of relay discovery in a wireless communications system according to an embodiment of the invention with reference to the system in FIG. 7. The process 1300 is used in an user equipment (UE) such as the relay UE in FIG. 7.

In step S1305, the UE receives at least one relay discovery request from a remote UE which announces relay discovery requests. Then, in step S1310, the UE transmits at least one relay service request to a network. In step S1315, the UE receives a relay service response indicating the acceptance of a relay service from the network, fir activating a relay function of the UE to start relaying traffic of ProSe communication for the remote UE which announces relay discovery requests.

Figure 14:
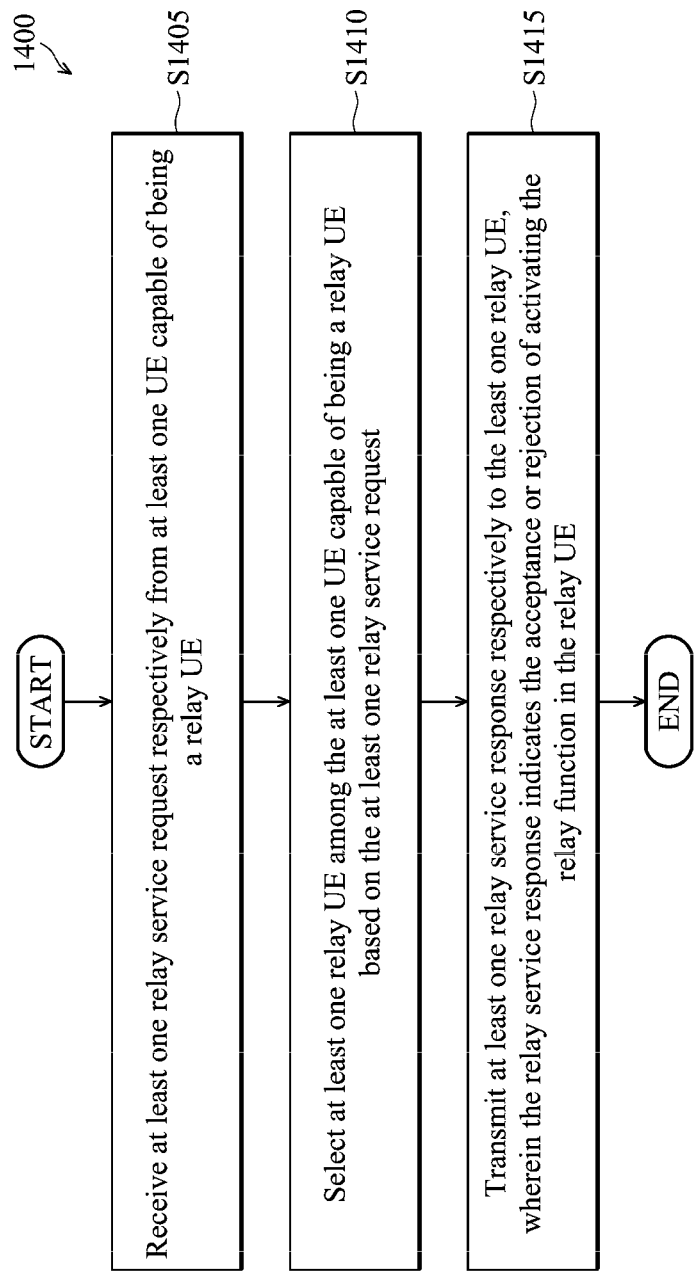
FIG. 14 is a flow chart of a process illustrating a method of relay discovery in a wireless communications system according to an embodiment of the invention with reference to the system in FIG. 7.

FIG. 14 is a flow chart of a process 1400 illustrating a method of relay discovery in a wireless communications system according to an embodiment of the invention with reference to the system in FIG. 7. The process 1400 is used in a network such as the network in FIG. 7.

In step S1405, the network receives at least one relay service request respectively from at least one UE capable of being a relay UE. Then, in step S1410, the network selects at least one relay UE among the at least one UE capable of being a relay UE based on the at least one relay service request. In step S1415, the network transmits at least one relay service response respectively to the least one relay 11E, wherein the relay service response: indicates the acceptance or rejection of activating the relay function in the relay UE.

Figure 15:
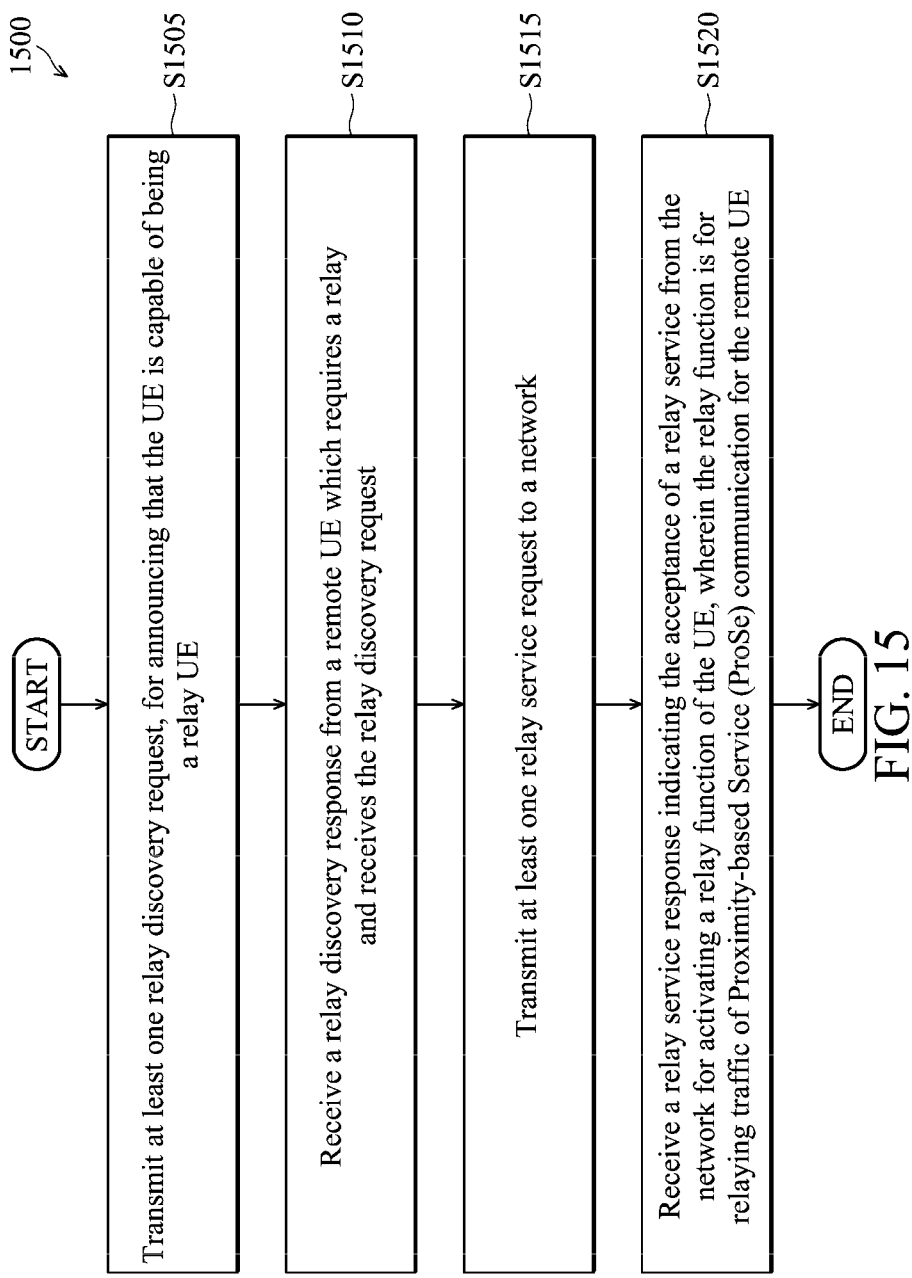
FIG. 15 is a flow chart of a process illustrating a method of relay discovery in a wireless communications system according to an embodiment of the invention with reference to the system in FIG. 5.

FIG. 15 is a flow chart of a process 1500 illustrating a method of relay discovery in a wireless communications system according to an embodiment of the invention with reference to the system in FIG. 8. The process 1500 is cased in a user equipment (UE) such as the relay UE in FIG. 8.

In step S1505, the UE transmits at least one relay discovery request, for announcing that the UE is capable of being a relay UE. Next, in step S1510, the UE receives a relay discovery response from a remote UE which requires a relay and receives the relay discovery request. Then, in step S1515, the UE transmits at least one relay service request to a network. In step S1520, the UE receives a relay service response indicating the acceptance of a relay service from the network for activating a relay function of the UE, wherein the relay function is for relaying traffic of Proximity-based Service (ProSe) communication for the remote UE.

Various aspects of the invention have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein, in addition, such an apparatus may be implemented or such a method may be practiced using another structure, functionality, or structure and functionality in addition to or other than one or more of the aspects set forth herein.

Those with skill in the art will understand that information and signals may be represented using any of a variety of different technologies and techniques. For example, data, instructions, commands, information, signals, bits, symbols, and chips that may be referenced throughout, the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In addition, the various illustrative logical blocks, modules, and circuits described in connection with the aspects disclosed herein may be implemented within or performed by an integrated circuit ("IC") an access terminal, or an access point. The IC may comprise a general-purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute code or instructions that reside within the IC, outside of the IC, or both. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal terra) to distinguish the claim elements.

While the invention has been described by way of example and in terms of preferred embodiment, it is to be understood that the invention is not thereto. Those who are skilled in this technology can still make various alterations and modifications without departing from the scope and spirit of this invention. Therefore, the scope of the present invention shall be defined and protected by the following claims and their equivalents.

What is claimed is:

1. A method of relay discovery and communication for a user equipment (UE) in a wireless communications system, comprising:
   receiving a configuration message sent from a serving network, wherein the configuration message identifies that the UE is a monitoring UE and indicates that the UE is authorized to be a relay UE;
   receiving a first relay discovery request, from a remote UE which announces relay discovery requests;
   transmitting a relay discovery response including an identification of the UE, to the remote UE;
   receiving a second relay discovery request including the identification of the UE, from the remote UE, wherein the second relay discovery request indicates that the UE is selected by the remote UE to be a selected relay UE for the remote UE; and
   activating a relay function to start relaying traffic of Proximity-based Service (ProSe) communication for the remote UE.

2. The method as claimed in claim 1, wherein the first relay discovery request sent by the remote UE comprises at least one of:
   a relay-UE indicator indicating the first relay discovery request is for discovering a relay UE;
   the credential of the remote UE, including configured parameters for the remote UE to use a relay UE for ProSe communication;
   a message type indicating that the first relay discovery request is an announcing message;
   a transmission type indicating broadcast, multicast or unicast that the remote UE request for relaying;
   a media type of the ProSe communication that the remote UE requests for relaying from the relay UE; and
   a group identifier (ID) indicating a requested group communication in which the remote UE has a group membership.

3. The method as claimed in claim 1, wherein the relay discovery response further comprises at least one of:
   a relay-UE indicator indicating the first relay discovery request is for discovering a relay UE;
   the credential of the UE, including configured parameters for the UE to act as a relay for ProSe communication;

a media type of the ProSe communication that the UE is authorized to relay when being a relay UE;
a received communication type, which is the type of traffic of ProSe communication that the UE is currently received from a serving network; and
a group identifier (ID) indicating a request group communication in which the UE has a group membership.

4. The method as claimed in claim 1, wherein the step of activating the relay function to start relaying traffic of ProSe communication for the remote UE comprises:
activating the relay function after the second relay discovery request including the identification of the UE is received.

5. The method as claimed in claim 1, wherein the UE initiates periodical monitoring operation on detection of the first relay discovery request when the UE receives traffic of ProSe communication from a serving network or a source UE.

6. The method as claimed in claim 1, wherein the UE uses radio resources dedicated for relaying ProSe communication assigned by a serving network or radio resources indicated in a system information message, or the UE uses preconfigured radio resources.

7. A method of relay discovery and communication for a user equipment (UE) in a wireless communications system, comprising:
receiving a configuration message sent from a serving network, wherein the configuration message identifies that the UE is an announcing UE and indicates that the UE is authorized to be a relay UE;
transmitting a relay discovery request, for announcing that the UE is capable of being a relay, wherein the first relay discovery request includes an identification of the UE;
receiving a relay discovery response from a remote UE which receives the relay discovery request, wherein the relay discovery response includes the identification of the UE and indicates that the UE is selected by the remote UE to be a selected relay UE for the remote UE; and
activating a relay function to start relaying traffic of Proximity-based Service (ProSe) communication for the remote UE.

8. The method as claimed in claim 7, wherein the relay discovery request further comprises at least one of:
a relay-UE indicator indicating the relay discovery request is for discovering any UE requiring a relay UE;
the credential of the UE, including configured parameters for the UE to act as a relay for ProSe communication;
a message type indicating the relay discovery request is an announcing message;
a transmission type indicating broadcast, multicast or unicast that the UE request for relaying;
a media type of traffic of ProSe communication that the UE is currently received from a serving network; and
a group identifier (ID) indicating a group communication in which the UE has a group membership.

9. The method as claimed in claim 7, wherein the relay discovery response further comprises at least one of:
a relay-UE indicator indicating the first relay discovery request is for discovering any UE requiring a relay UE;
the credential of the remote UE, including configured parameters for the remote UE to use a relay UE for ProSe communication;
a media type of the ProSe communication that the remote UE requests for relaying from the relay UE; and
a group identifier (ID) indicating a requested group communication in which the remote UE has a group membership.

10. The method as claimed in claim 7, wherein the step of activating the relay function to start relaying traffic of ProSe communication for the remote UE comprises:
activating the relay function after the relay discovery response including the identification of the UE is received.

11. The method as claimed in claim 7, wherein the UE initiates periodically transmitting the relay discovery request when the UE receives traffic of ProSe communication from a serving network or a source UE.

12. The method as claimed in claim 7, wherein the UE uses radio resources dedicated for relaying ProSe communication assigned by a serving network or radio resources indicated in a system information message, when the UE is in the coverage of the serving network, or the UE uses preconfigured radio resources when the UE is out of the coverage of the serving network.

13. A method of relay discovery and communication for a user equipment (UE) in a wireless communications system, comprising:
receiving a configuration message sent from a serving network, wherein the configuration message identifies that the UE is a monitoring UE in a relay discovery procedure;
receiving at least one relay discovery request, each relay discovery request including an identification of a relay UE, from at least one relay UE; and
selecting the first relay UE among the at least one relay UE based on the at least one relay discovery request;
transmitting a relay discovery response including an identification of a first relay UE among the at least one relay UE, for acknowledging the first relay UE to activate a relay function for relaying traffic of Proximity-based Service (ProSe) communication for the UE.

14. The method as claimed in claim 13, wherein the UE initiates periodical monitoring operation on detection of the relay discovery request when the UE loses ProSe communication with a serving network or a source UE.

15. The method as claimed in claim 13, wherein each relay discovery request further comprises at least one of:
a relay-UE indicator indicating the first relay discovery request is for discovering any UE requiring a relay UE;
the credential of the relay UE, including configured parameters for the relay UE to act as a relay for ProSe communication;
a message type indicating the relay discovery request is an announcing message;
a transmission type indicating broadcast, multicast or unicast that the UE request for relaying;
a media type of traffic of ProSe communication that the relay UE is currently received from a serving network; and
a group identifier (ID) indicating a group communication in which the relay UE has a group membership.

16. The method as claimed in claim 13, wherein the relay discovery response further comprises at least one of:
a relay-UE indicator indicating the relay discovery request is for discovering any UE requiring a relay UE;
the credential of the UE, including configured parameters for the UE to use a relay UE for ProSe communication;
a media type of the ProSe communication that the UE requests for relaying from the relay UE; and
a group identifier (ID) indicating a requested group communication in which the UE has a group membership.

17. A method of relay discovery for a UE in a wireless communications system, comprising:
- receiving at least one relay discovery request, from a remote UE which announces relay discovery requests;
- transmitting at least one relay service request to a network; and
- receiving a relay service response indicating the acceptance of a relay service from the network, for activating a relay function of the UE to start relaying traffic of ProSe communication for the remote UE which announces relay discovery requests,
- wherein each relay service request transmitted to the network comprises at least one of a first index indicating which relay discovery request from a remote UE is received by the UE capable of being a relay UE, a second index indicating which relay discovery response is used for the UE to respond to the relay discovery request, and a period or timing information that the UE receives the relay discovery requests.

18. The method as claimed in claim 17, wherein each relay service request comprises an identification of the remote UE and an identification of the UE which is capable of being a relay UE.

19. The method as claimed in claim 17, wherein each relay discovery request is any one of a Primary Synchronization Signal (PSS), Secondary Synchronization Signal (SSS) and a random access preamble.

20. The method as claimed in claim 18, further comprising:
- transmitting a relay discovery response to the remote UE to acknowledge to the remote UE in response to the relay discovery request, after the relay service response indicating the acceptance of the relay service is received, wherein the relay discovery response is utilized for the remote UE to synchronize with the UE.

21. A method for relay discovery for a network in a wireless communications system, comprising:
- receiving at least one relay service request respectively from at least one UE capable of being a relay UE;
- selecting at least one relay UE among the at least one UE capable of being a relay UE based on the at least one relay service request; and
- transmitting at least one relay service response respectively to the least one relay UE, wherein the relay service response indicates the acceptance or rejection of activating the relay function in the relay UE,
- wherein each of at least one relay service request is the same as a relay discovery request which is received by the UE from a remote UE requiring a relay, when the UE acts as a monitoring UE.

22. The method as claimed in claim 21, wherein each relay service request includes an identification of a remote UE and an identification of a UE capable of being a relay UE.

23. The method as claimed in claim 21, wherein the at least one UE capable of being a relay UE acts as either a monitoring UE or an announcing UE.

24. The method as claimed in claim 21, wherein when the relay service response indicates the acceptance of activating the relay function, the relay service response comprises resources and parameters for ProSe communication between the relay UE and the remote UE and/or resources and parameters for the relay UE to respond to the relay discovery request transmitted by the remote UE which requires a relay.

* * * * *